(12) United States Patent
Plache et al.

(10) Patent No.: US 8,818,757 B2
(45) Date of Patent: Aug. 26, 2014

(54) MODULAR OBJECT AND HOST MATCHING

(75) Inventors: Kenneth Scott Plache, Scottsdale, AZ (US); Daniel Baliey Seger, Kennesaw, GA (US); Raymond John Staron, Chagrin Falls, OH (US); Taryl Jon Jasper, South Euclid, OH (US); James Harry Jarrett, Baltimore, MD (US); Russell William Brandes, Brunswick, OH (US); Ronald Eric Bliss, Twinsburg, OH (US); Michael Dan Kalan, Highland Heights, OH (US); Subbian Govindaraj, Solon, OH (US); Kenwood Henry Hall, Hudson, OH (US); Douglas James Reichard, Fairview, OH (US); Robert John Kretschmann, Bay Village, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 187 days.

(21) Appl. No.: 12/241,319

(22) Filed: Sep. 30, 2008

(65) Prior Publication Data

US 2010/0082123 A1      Apr. 1, 2010

(51) Int. Cl.
*G21C 17/00* (2006.01)
*G05B 11/01* (2006.01)

(52) U.S. Cl.
USPC ............................................ 702/182; 700/19

(58) Field of Classification Search
USPC ............. 702/33, 44, 113–115, 182, 183, 185, 702/186–188; 717/168–178; 709/220–222, 709/226; 700/3, 19
See application file for complete search history.

(56) References Cited

U.S. PATENT DOCUMENTS

| 5,485,620 A | 1/1996 | Sadre et al. |
| 5,522,066 A | 5/1996 | Lu |

(Continued)

FOREIGN PATENT DOCUMENTS

| CN | 101201598 A | 6/2008 |
| CN | 101201599 A | 6/2008 |

(Continued)

OTHER PUBLICATIONS

European Search Report for European Application No. 09171807.2-1238 dated Feb. 4, 2008, 7 pages.

(Continued)

*Primary Examiner* — Sujoy Kundu
*Assistant Examiner* — Ricky Ngon
(74) *Attorney, Agent, or Firm* — Amin, Turocy & Watson, LLP

(57) ABSTRACT

An object can be used in an industrial control configuration in relation to performing a function or task. Matching can occur such that an object with operational requirements can bind with a host that has capabilities that meet those operational requirements—matching can occur automatically as well as through user operation. Once matched, different functionality can be presented to a user pertaining to the object. To assist the user, the object can include external references, logic, local or private data, as well as others in addition to resources. To facilitate operation, capabilities and resources can be published in a directory that can be accessed by different entities—sometimes with security constraints in order to protect configuration integrity. Likewise, a subscription system can be employed such that when a change to a related entity is made, a notice can transfer to related entities and operation can alter based upon the change.

16 Claims, 25 Drawing Sheets

(56) References Cited

U.S. PATENT DOCUMENTS

| | | | |
|---|---|---|---|
| 5,530,861 | A | 6/1996 | Diamant et al. |
| 5,812,394 | A | 9/1998 | Lewis et al. |
| 5,907,704 | A | 5/1999 | Gudmundson et al. |
| 5,946,681 | A * | 8/1999 | Shorter .............................. 707/3 |
| 6,067,299 | A | 5/2000 | DuRee |
| 6,085,222 | A | 7/2000 | Fujino et al. |
| 6,104,962 | A * | 8/2000 | Sastry ............................. 700/86 |
| 6,154,684 | A | 11/2000 | Schwenke et al. |
| 6,269,254 | B1 | 7/2001 | Mathis |
| 6,437,805 | B1 | 8/2002 | Sojoodi et al. |
| 6,477,435 | B1 | 11/2002 | Ryan |
| 6,505,247 | B1 | 1/2003 | Steger et al. |
| 6,539,271 | B2 | 3/2003 | Lech et al. |
| 6,553,268 | B1 | 4/2003 | Schwenke et al. |
| 6,615,166 | B1 | 9/2003 | Guheen et al. |
| 6,618,856 | B2 | 9/2003 | Coburn et al. |
| 6,718,533 | B1 | 4/2004 | Schneider et al. |
| 6,868,538 | B1 | 3/2005 | Nixon et al. |
| 7,016,759 | B2 | 3/2006 | Kaever et al. |
| 7,020,697 | B1 | 3/2006 | Goodman et al. |
| 7,043,311 | B2 | 5/2006 | Nixon et al. |
| 7,058,712 | B1 | 6/2006 | Vasko et al. |
| 7,080,066 | B1 | 7/2006 | Scheurich et al. |
| 7,089,530 | B1 | 8/2006 | Dardinski et al. |
| 7,096,465 | B1 | 8/2006 | Dardinski et al. |
| 7,146,232 | B2 | 12/2006 | Staron et al. |
| 7,159,007 | B2 | 1/2007 | Stawikowski et al. |
| 7,194,446 | B1 | 3/2007 | Bromley et al. |
| 7,197,493 | B2 | 3/2007 | Asbhy et al. |
| 7,225,037 | B2 | 5/2007 | Shani |
| 7,233,830 | B1 | 6/2007 | Callaghan |
| 7,266,677 | B1 | 9/2007 | Bromley et al. |
| 7,272,815 | B1 | 9/2007 | Eldridge et al. |
| 7,363,338 | B2 | 4/2008 | Kaakani et al. |
| 7,395,122 | B2 | 7/2008 | Kreidler et al. |
| 7,418,305 | B2 | 8/2008 | Buesgen et al. |
| 7,505,817 | B2 | 3/2009 | McDaniel et al. |
| 7,509,249 | B2 | 3/2009 | Britt et al. |
| 7,627,385 | B2 | 12/2009 | McGreevy et al. |
| 7,653,008 | B2 | 1/2010 | Patrick et al. |
| 7,676,279 | B2 | 3/2010 | Hood et al. |
| 7,970,830 | B2 | 6/2011 | Staggs et al. |
| 8,214,455 | B2 | 7/2012 | Baier et al. |
| 2001/0034557 | A1 | 10/2001 | Hudson et al. |
| 2001/0052113 | A1 | 12/2001 | Hearne et al. |
| 2002/0059272 | A1 | 5/2002 | Porter |
| 2002/0156548 | A1 | 10/2002 | Arackaparambil et al. |
| 2003/0023336 | A1 | 1/2003 | Kreidler et al. |
| 2003/0045950 | A1 | 3/2003 | Bronikowski et al. |
| 2003/0150927 | A1 | 8/2003 | Rosen |
| 2003/0163656 | A1 | 8/2003 | Ganton |
| 2004/0015568 | A1 | 1/2004 | Kaakani et al. |
| 2004/0139427 | A1 | 7/2004 | Garvey |
| 2004/0199925 | A1 | 10/2004 | Nixon et al. |
| 2004/0230328 | A1 | 11/2004 | Armstrong et al. |
| 2005/0080788 | A1 | 4/2005 | Murata |
| 2005/0125735 | A1 * | 6/2005 | Cohen et al. ................... 715/746 |
| 2005/0229004 | A1 | 10/2005 | Callaghan |
| 2005/0234873 | A1 | 10/2005 | Milligan |
| 2005/0256735 | A1 | 11/2005 | Bayne |
| 2006/0031855 | A1 | 2/2006 | Smithline |
| 2006/0037008 | A1 | 2/2006 | Stelzer et al. |
| 2006/0059127 | A1 | 3/2006 | Berry et al. |
| 2006/0179032 | A1 | 8/2006 | Gottsman et al. |
| 2006/0206448 | A1 | 9/2006 | Hyder et al. |
| 2006/0212146 | A1 | 9/2006 | Johnson et al. |
| 2006/0259954 | A1 | 11/2006 | Patrick |
| 2006/0271505 | A1 | 11/2006 | Vierich et al. |
| 2006/0277289 | A1 | 12/2006 | Bayliss et al. |
| 2007/0011281 | A1 | 1/2007 | Jhoney et al. |
| 2007/0055757 | A1 | 3/2007 | Mairs et al. |
| 2007/0073850 | A1 | 3/2007 | Callaghan et al. |
| 2007/0089063 | A1 | 4/2007 | Breyer |
| 2007/0124475 | A1 | 5/2007 | Syed et al. |
| 2007/0142941 | A1 | 6/2007 | McGreevy et al. |
| 2007/0250630 | A1 | 10/2007 | Blanding |
| 2007/0256051 | A1 | 11/2007 | Rojer |
| 2008/0022151 | A1 | 1/2008 | Stange et al. |
| 2008/0040477 | A1 | 2/2008 | Johnson et al. |
| 2008/0079558 | A1 | 4/2008 | Dorgelo et al. |
| 2008/0082186 | A1 | 4/2008 | Hood et al. |
| 2008/0082577 | A1 | 4/2008 | Hood |
| 2008/0082636 | A1 | 4/2008 | Hofmann et al. |
| 2008/0082959 | A1 | 4/2008 | Fowler |
| 2008/0092131 | A1 | 4/2008 | McIntyre et al. |
| 2008/0127065 | A1 | 5/2008 | Bryant et al. |
| 2008/0140230 | A1 | 6/2008 | Bromley |
| 2008/0201297 | A1 | 8/2008 | Choi et al. |
| 2008/0208361 | A1 | 8/2008 | Grgic |
| 2008/0208368 | A1 | 8/2008 | Grgic |
| 2008/0284649 | A1 | 11/2008 | Bratthall et al. |
| 2009/0083705 | A1 | 3/2009 | Phillips et al. |
| 2009/0083843 | A1 | 3/2009 | Wilkinson et al. |
| 2009/0328012 | A1 | 12/2009 | Aharoni et al. |
| 2010/0088104 | A1 | 4/2010 | DeRemer et al. |
| 2010/0192125 | A1 | 7/2010 | Son et al. |

FOREIGN PATENT DOCUMENTS

| | | |
|---|---|---|
| DE | 19614789 C1 | 9/1997 |
| DE | 101 29 564 A1 | 9/2002 |
| EP | 1276026 A | 1/2003 |
| EP | 1422619 A | 5/2004 |
| EP | 1 772 785 A | 4/2007 |
| EP | 1 906 276 A2 | 4/2008 |
| EP | 1 936 496 A1 | 6/2008 |
| EP | 1 906 276 A3 | 12/2009 |
| EP | 2 169 597 A1 | 3/2010 |
| EP | 2 169 598 A1 | 3/2010 |
| EP | 2 169 599 A1 | 3/2010 |
| WO | 0195041 A1 | 12/2001 |
| WO | 02/31607 A | 4/2002 |
| WO | 2004086160 A1 | 10/2004 |

OTHER PUBLICATIONS

European Search Report for European Patent Application No. EP07117140, dated May 7, 2008, 8 pages.
Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.
Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.
OA Dated Oct. 6, 2008 for U.S. Appl. No. 11/536,715, 23 pages.
OA Dated Oct. 29, 2008 for U.S. Appl. No. 11/536,746, 23 pages.
OA Dated Oct. 29, 2008 for U.S. Appl. No. 11/536,791, 43 pages.
OA Dated Oct. 7, 2008 for U.S. Appl. No. 11/536,760, 33 pages.
OA Dated Oct. 9, 2009 for U.S. Appl. No. 11/536,827, 18 pages.
OA dated Apr. 13, 2009 for U.S. Appl. No. 11/536,746, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
OA dated Aug. 24, 2009 for U.S. Appl. No. 11/536,746, 18 pages.
OA dated Aug. 21, 2009 for U.S. Appl. No. 11/536,760, 17 pages.
OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.
European Search Report dated Nov. 20, 2009 for European Application No. EP 07 11 7192, 9 pages.
"SIMATIC, Working with STEP V5.1, Edition Aug. 2000, A5E00069681-03". Aug. 2000, Siemens, D-90327, Nurnberg, DE, XP002554626.
Fayad, et al. "HMI as a Maintainance tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph—p. 133, last paragraph.
OA dated Jan. 26, 2010 for U.S. Appl. No. 11/536,791, 39 pages.

(56) References Cited

OTHER PUBLICATIONS

OA dated Mar. 18, 2010 for U.S. Appl. No. 11/536,760, 19 pages.
OA dated Mar. 8, 2010 for U.S. Appl. No. 11/536,746, 21 pages.
European Search Report on European Patent Application No. EP09171802.3-1238, dated Jan. 29, 2010, 6 pages.
European Search Report for European Application No. 09171806.4-1238 dated Apr. 2, 2010, 8 pages.
European Search Report dated Jan. 25, 2010 for European Application No. EP09171807, 2 pages.
OA dated May 14, 2010 for U.S. Appl. No. 11/536,715, 49 pages.
"Datastream 7i for SQL Server"; Jun. 13, 2006, Infor, 2 pages.
European Search Report Dated Jan. 21, 2010 for European Application No. EP09171802, 2 pages.
European Search Report Dated Jan. 27, 2010 for European Application No. EP09171806, 2 pages.
Raymond Staron, et al. Use of an Agent Type Library for the Design and Implementation of Highly Flexible Control Systems. Last accessed on Oct. 10, 2008, 6 pages.
Marvin J. Schwenke, et al. Specifying a Control Program with High Level Graphical Editors. (c) 2001 Society of Automotive Engineers, Inc. Last accessed on Oct. 10, 2008, 9 pages.
Marvin J. Schwenke, et al. Use of a Type Library to Speed Up PLC Program Design and Commissioning. Last accessed on Oct. 10, 2008, 13 pages.
OA dated Dec. 16, 2010 for U.S. Appl. No. 11/536,818, 50 pages.
OA dated Aug. 20, 2012 for U.S. Appl. No. 12/893,545, 52 pages.
Article entitled "Viewanyware solutions from Rockwell Automation", by SAIMC, dated May 2001.
Article entitled "Automation Today", by Rockwell, dated Feb. 2001.
Article entitled "ViewAnyWare" by Rockwell, dated Jun. 10, 2004.
Article entitled "ViewAnyWare: Picture the Reaility" by Rockwell, Copyright 2004.
Oa dated Aug. 2, 2012 for U.S. Appl. No. 12/893,366, 50 pages.
OA dated Jan. 25, 2012 for U.S. Appl. No. 12/241,327, 45 pages.
OA dated Feb. 4, 2013 for U.S. Appl. No. 12/893,545, 36 pages.
OA dated Apr. 25, 2013 for U.S. Appl. No. 12/893,804, 39 pages.
OA dated Feb. 1, 2013 for U.S. Appl. No. 12/893,366, 20 pages.
OA dated Feb. 24, 2011 for U.S. Appl. No. 12/241,342, 35 pages.
OA dated May 10, 2011 for U.S. Appl. No. 11/536,791, 46 pages.
OA dated Oct. 24, 2011 for U.S. Appl. No. 11/536,791, 35 pages.
Office Action dated Sep. 30, 2013 for U.S. Appl. No. 12/893,550, 48 pages.
Notice of Allowance dated Sep. 13, 2013 for U.S. Appl. No. 12/893,804, 25 pages.
Office Action dated Dec. 5, 2013 for U.S. Appl. No. 12/893,883, 58 pages.

* cited by examiner

MODULAR OBJECT AND HOST MATCHING

TECHNICAL FIELD

The subject specification relates generally to operation of an industrial control configuration and in particular to using modular objects in conjunction with a host.

BACKGROUND

Industrial control environments can typically involve complex mechanical, electronic, electromechanical, and/or robotic machinery that perform various automated mechanical and/or electrical functions. Such machinery can include industrial motors, pumps, conveyors, escalators, drills, refrigeration systems, and so on, that can provide a particular physical output. Typically, an industrial environment utilizes one or more control devices to determine when to activate or deactivate such machinery, as well as an appropriate level of activation, for instance (e.g., an amount of current to supply a variable input motor). Additionally, the control devices are associated with logical program code that can determine an appropriate time, degree, manner, etc., to operate such machinery based on various determinable circumstances (e.g., output of another device, reading of an optical sensor, electronic measurement such as current level in a device, movement or number of rotations of a device, and so on).

A technician can engage this machinery in order to provide different types of functionality. Initially, a group of individuals can logically and physically construct an industrial control process using this machinery. A diagnostic test can be performed to ensure that the machinery is correctly placed and operates as anticipated (e.g., physical pipes are connected together without substantial leakage). Once in operation, a supervisor can designate how the machinery should operate and a maintenance worker can perform repair and preventative tasks to ensure proper functioning continues (e.g., adding oil to moving mechanical parts.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

In an industrial control configuration, a plurality of modular objects can exist for performing tasks. To assist in performing these tasks, the modular objects can interface with at least one host such that the modular object can use a capability of the host. In order to facilitate proper operation, modular objects can be matched and bound with a host that has capabilities to complement operational needs of the modular object. Metadata pertaining to multiple hosts can be collected including metadata relating to capabilities of the host. A check can be performed to determine if a match should occur and if the match should occur, then the modular object can be bound with the host.

To improve operation of the matching, a directory can be used to publish capability and/or operational requirement information. Upon a modular object or host entering a configuration or being modified, an analysis can occur to determine if there is a change. If a change occurs, then capability or requirement information can be placed in a directory. A resource manager can use the directory to create bindings or hosts and/or modular objects can match with one another on their own. In addition, a subscription service can be used to communicate similar information.

The following description and the annexed drawings set forth certain illustrative aspects of the specification. These aspects are indicative, however, of but a few of the various ways in which the principles of the specification can be employed. Other advantages and novel features of the specification will become apparent from the following detailed description of the specification when considered in conjunction with the drawings.

DETAILED DESCRIPTION

Figure 1:
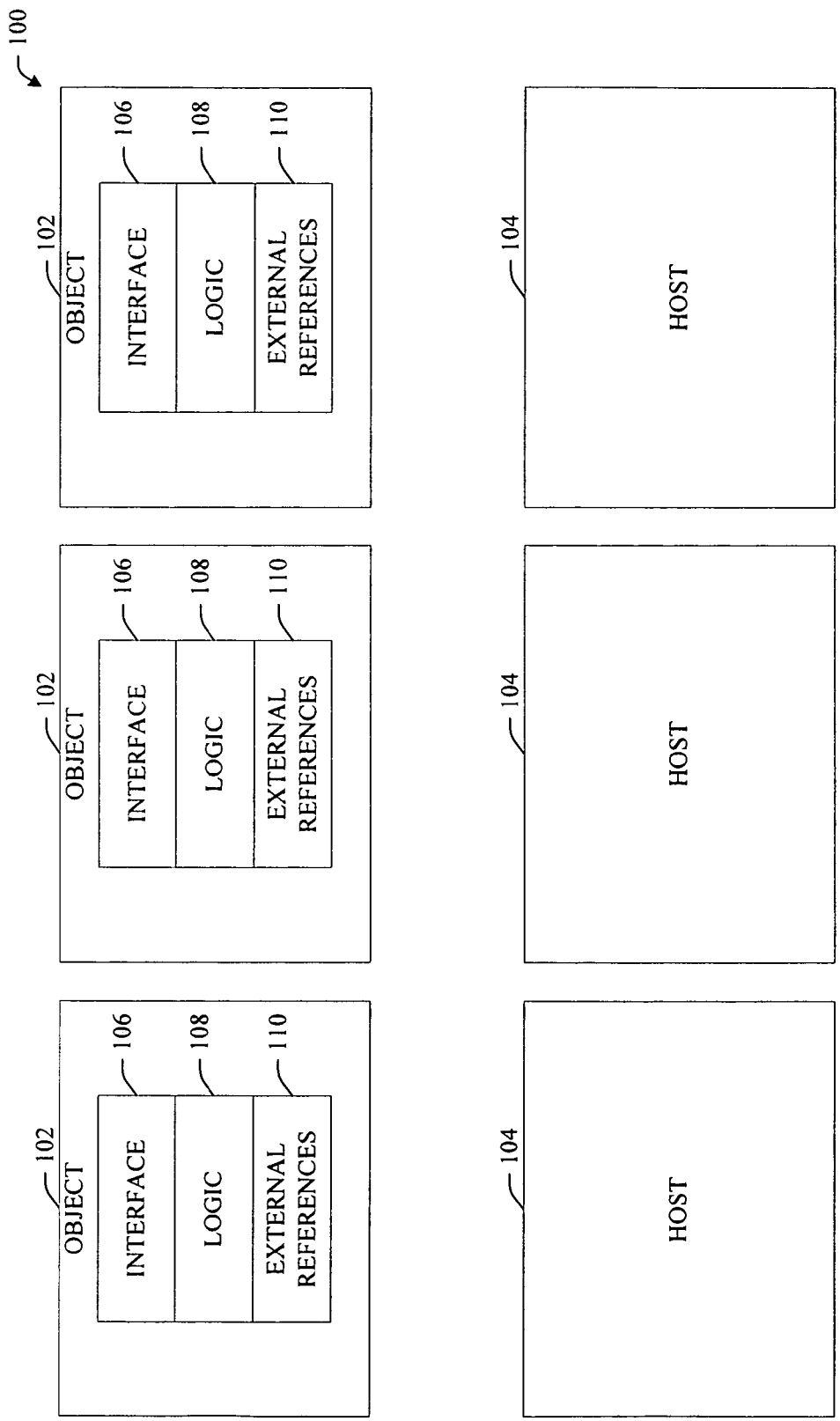
FIG. 1 illustrates a representative configuration of objects and hosts in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It can be evident, however, that the claimed subject matter can be practiced without these specific details. In other instances, well-known structures and devices are shown in block diagram form in order to facilitate describing the claimed subject matter.

As used in this application, the terms "component," "module," "object", "system," "interface," or the like are generally intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. As another example, an interface can include I/O components as well as associated processor, application, and/or API components.

Now referring to FIG. 1, an example system 100 (e.g., portion of an industrial control configuration) is disclosed Objects 102 (e.g., modular objects, encapsulated objects, control object, etc.) can exist in conjunction with a plurality of hosts 104 upon an industrial control configuration. Functionality related to the objects 102 can be similar to plug-in approaches in software. The objects 102 can grow into different layers (e.g., into an organizational hierarchy developed automatically or by a user) to form an object oriented control system and there can be various attributes associated with an object 102 (e.g., higher levels of organization inherit characteristics of lower level objects). Moreover, the objects 102 can have different features that can be used across different hierarchical levels.

Users can create these objects 102 and then connect them in a way that represents a process or the objects 102 can be created through an automated process. The objects 102 can include different portions that enable engagements with other entities and assist in performing functionality. An interface 106 (e.g., an interface component) can define external behavior supplied to at least one client application engaging the object 102. Through the interface 106, objects 102 can expose data, expose operations that can be performed, expose dependencies on other objects, etc. It is to be appreciated that an object can support more than one interface (e.g., to engage with more than one client application) and/or multiple logic portions can facilitate engagement with more than one host.

The objects 102 can include logic 108 (e.g., controller logic, support for a human-machine interface, etc.) that can be in an enterprise system, in a separate location, and the like. It is to be appreciated that an object can support more than one logic component (e.g., to engage with more than one host 104). External references 110 (e.g., a reference component) can retain metadata pertaining to the object (e.g., one of the objects 102). The external references can include information that describes dependencies of the object 102, indicates required connections to support the logic 108 (e.g., an operational requirement), and the like. While disclosed as multiple external references, an object 102 can be practiced with a reference component with one external reference. It is to be appreciated that the objects 102 can include other portions, such as local data, visualization elements, etc. Conversely, an object 102 can be more limited in nature than what is disclosed (e.g., the object includes only logic). These objects 102 can be created at and/or developed in mind of original equipment manufacturers that apply the objects 102 to different devices for different purposes (e.g. a general packager). Development of the objects 102 can be such that the object can engage with multiple customers and/or multiple plans. This differs from conventional practice where an object is developed to engage with a single plant of a single customer. Use of these types of objects goes against conventional thought in the industry since it is commonly desired to have objects specifically made for a customer and not a general and customizable object that can be reused.

Figure 2:
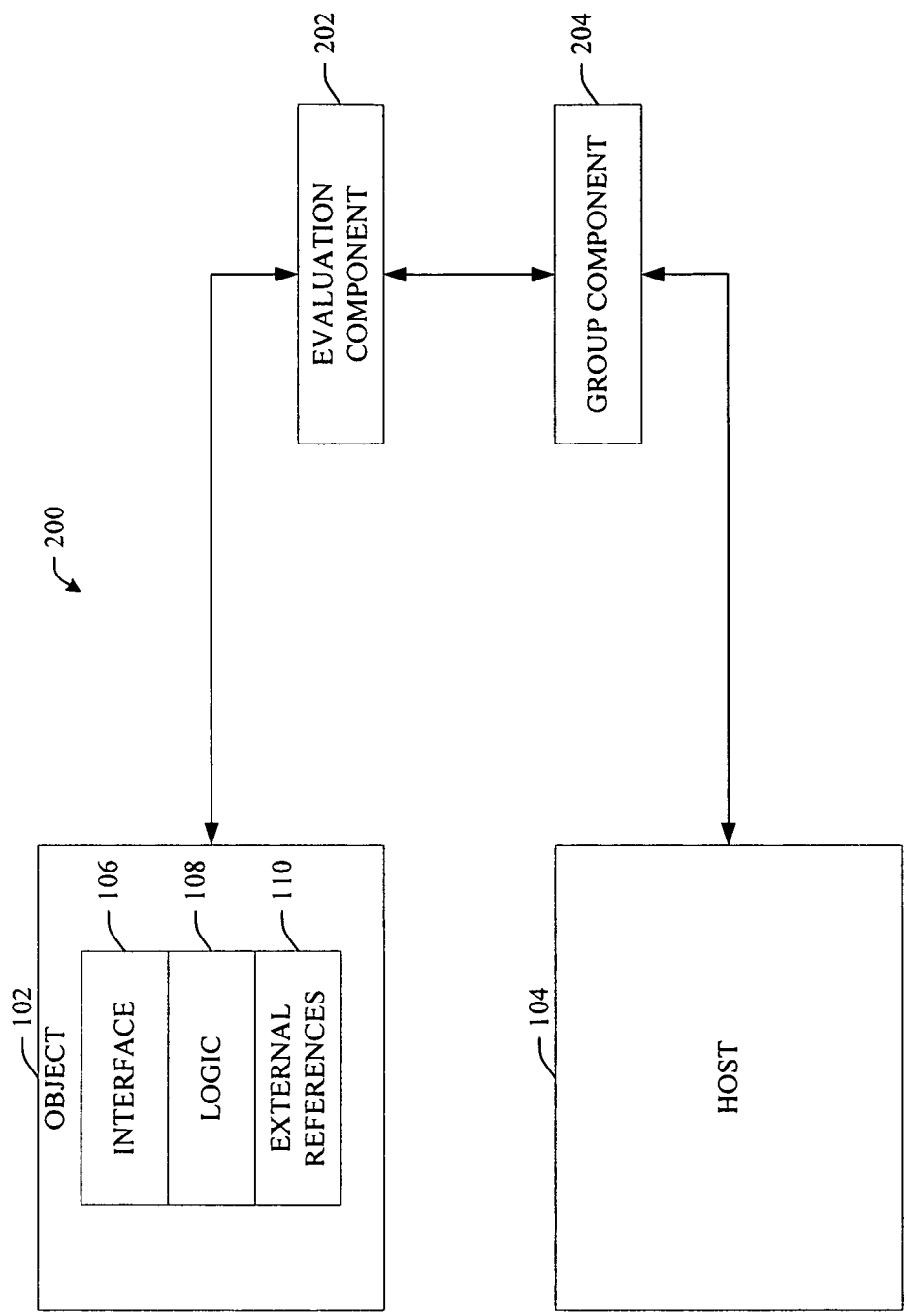
FIG. 2 illustrates a representative object matching system in accordance with an aspect of the subject specification.

Now referring to FIG. 2, an example system 200 is disclosed for matching an object 102 with a host 104. The object 102 can provide an external interface 106, logic 108, or reference 110 to facilitate operation. In addition, the object 102 can include a number of operational requirements that should be met in order to operate in a desired manner. To meet these operational requirements, the object 102 can be linked with a host 104 that has at least one capability and/or meets required (or mandatory) capabilities that complement the operational requirement of the object 102.

An operational requirement of an object is commonly a capability that should be used in order for the object 102 to function in a particular manner. According to one embodiment, the operational requirement must be met for the object 102 to operate—however, it is to be appreciated that is not the case in many scenarios and at least on operational requirement is desirable, preferential, and the like. Example operational requirements (e.g., that can be met be a host capability) can include resolution memory size, version, language, timing, and the like.

Information can be collected pertaining to an operational need (e.g., operational requirement) of the object 102. Example information can include what the operational need is, how important the requirement is, if the requirement is critical (e.g., absolutely necessary for operation) and the like. In addition, information can be collected on what hosts are part of the system 200, capabilities of those hosts, if the capability is used by another object, etc. The system 200 can use an evaluation component 202 that appreciates at least one capability of at least one host and at least one hosting requirement of at least one industrial modular object.

A group component 204 that matches a host 104 and an industrial modular object (e.g., object 102) based upon a hosting requirement of the matched object being met by a capability of the matched host, which can be determined by the evaluation component 202. Matching the host and object can include creating a software binding, where the object can exploit the capability of the host 104. Prior to matching, a request can be made to the object and/or host 104 on if the bind should occur.

In an illustrative instance, the object 102 can facilitate disclosure of an alarm in an industrial control conveyer process to a user. With the object 102 a physical representation of the process is shown with normal functioning represented in green and alarm functioning (e.g., a portion being in error) shown in red. For the host 104 to properly disclose the process, the host 104 should have a capability of being able to show red and green. According to one embodiment, there can be a necessary capability (e.g., show red and green) and a desirable capability (e.g., display color). The evaluation component 202 can determine the capability of the host 104 and operational requirement. If the host 104 does have a capability to disclose green and red, then the group component 204 can match the host 104 with the object 102.

Figure 3:
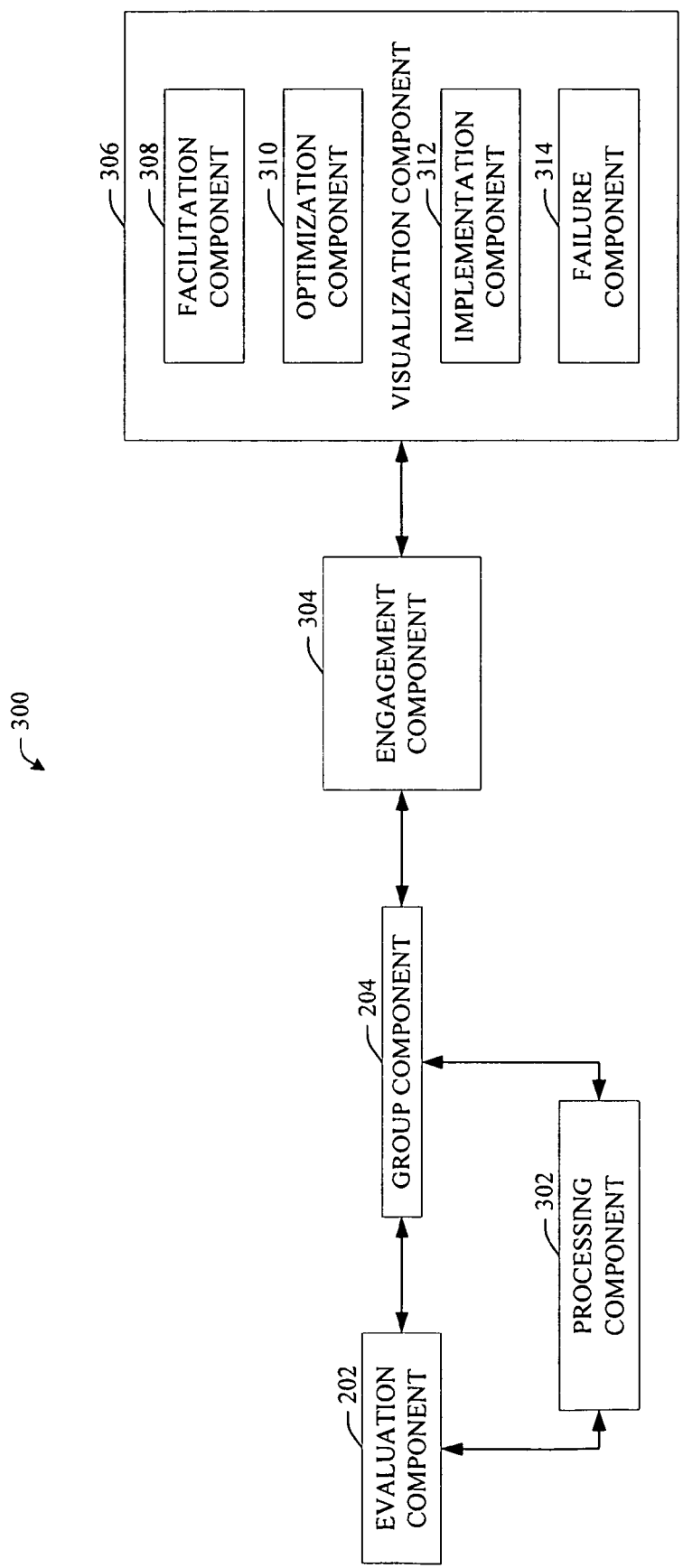
FIG. 3 illustrates a representative for matching a host with at least one object or matching an object with at least one host in accordance with an aspect of the subject specification.

Now referring to FIG. 3, an example system 300 is disclosed relating to matching an object with a host 104. The system 300 can use the evaluation component 202 and group component 204 to create a match between a host and object. A processing component 302 can be used that provides functionality to the system 300. According to one embodiment, each industrial modular object is matched with one host if there is one matching host or matched with all hosts meeting hosting requirement of the industrial modular object if there is more than two matching hosts. For example, if there is one host that matches one object, then a bind can occur. However, if there are multiple hosts that meet a requirement of the object, then the object can bind with each host and determine at runtime which host to use. In addition, if there are multiple objects that have a requirement and a lesser number of hosts, such as one host, then multiple objects can bind with a host and the host (or a third-party unit) can regulate which object takes precedence if multiple objects want to exploit a capability at one time.

An engagement component 304 can be used that presents a user with a host that matches a hosting requirement if there is one match or presents at least a portion of hosts matching the hosting requirement (e.g., all hosts) if there are two or more matches. For example, if there is one host matching one object, then the user can be notified of the match. However, if there are multiple matching hosts, then the user can be notified of the matches and be asked to provide a selection—the selection is used to create a binding between an object and selected host. According to one embodiment, the user is presented with one host even if multiple hosts are available (e.g., for confirmation purposes), where the presented host is selected for presentation based on at least one criterion (e.g., a host that operates fastest).

The system 300 can use a visualization component 306 to enable a user to interface with the host and/or object. A facilitation component 308 can enable a user to select at least one host to associate with the industrial modular object. Thus matching of the group component 204 is performed through instruction of the user. However, the group component 204 can function automatically and/or ignore a user instruction. In order to facilitate a more collaborative experience, the system 300 can use an optimization component 310 that suggests to the user a host to integrate with the industrial modular object based upon estimated performance of the host, industrial modular object, industrial control configuration, or a combination thereof. Moreover, the suggestion can be based upon capabilities (e.g., display rendering capabilities, instruction set capabilities, installed library support, etc.), as well as other criteria. The suggestion can be made through implementation of at least one artificial intelligence technique, through use of a rule set (e.g., suggest a host/object combination with a fastest anticipated or historical performance), etc.

An implementation component 312 can perform the selected integration. In addition, a failure component 314 can notify a user through the engagement component 304 that there is not a match with the industrial modular object when a match does not occur. In addition, the failure component 314 can send the notice when there is a match, but it is undesirable for a match to occur (e.g. using the match would have performance drop below a desired level).

Figure 4:
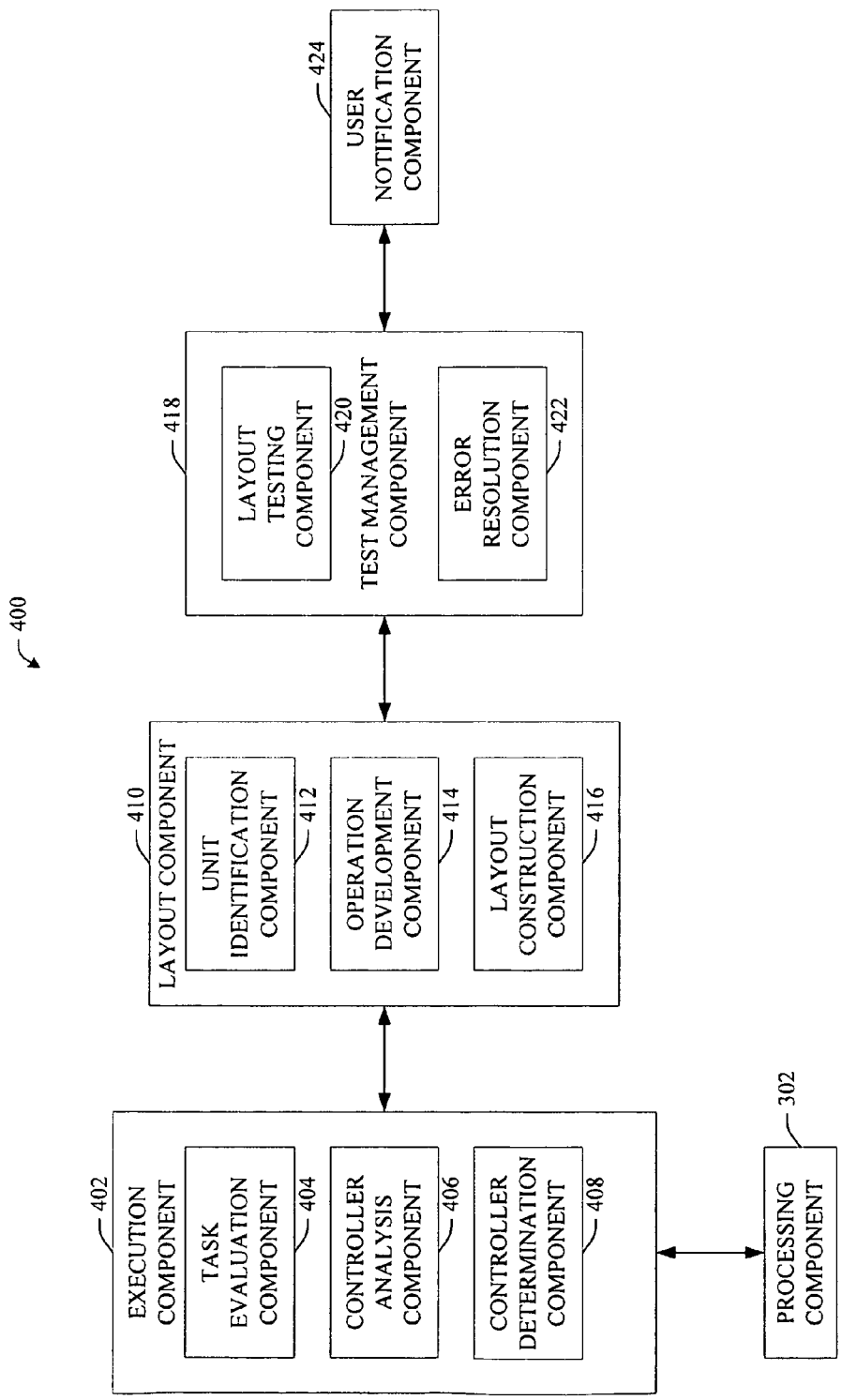
FIG. 4 illustrates a representative system for managing object matching in accordance with an aspect of the subject specification.

Now referring to FIG. 4, an example system 400 is disclosed for managing a controller in relation to using objects. An execution component 402 can be used to determine how a control can function with regard to hosting multiple components. According to one embodiment, a processing component 302 can be used by components of the system 400. The execution component 402 can collect a notice that a task is to be performed and a task evaluation component 404 can scrutinize the task to determine a number of related object, how the objects correlate, and the like. The task evaluation component 404 can operate as means for evaluating a task to determine a number of objects in relation to the task. A controller analysis component 406 can evaluate a controller to determine controller characteristics. Example characteristics can include memory size, processing speed, and the like—these characteristics can be used in how the controller can function regarding task objects. The controller analysis component 406 can operate as means for analyzing a controller to determine how many objects can be held by the controller. A controller determination component 408 can use results of the components 404 and 406 to determine if more than one controller should be used to hold the task object. This can be based upon a determination if the controller is able to hold the objects as well as if it is desirable for the controller to hold the objects (e.g., the controller is able, but performance speed would be greatly diminished). Thus, in addition to determining if the controller can hold the objects, a determination can be made by the controller determination component 408 on how well suited the controller is to hold a modular object in general and/or how well suited the controller is at holding the specific task objects in question. The controller determination component 408 can implement as means for determining if the controller can hold the task objects based upon a result of the evaluation and a result of the analysis. According to one embodiment, the determination is made prior to downloading the task, where the task is an application.

If it is determined that more than one controller should be used, then a layout component 410 can be employed to manage multiple units to accommodate task needs. Thus, the layout component 410 can facilitate in using a layout (e.g., a layout is an organization or two or more controllers to hold objects associated with one task). The controller analysis component 406 can analyze other controllers in view of task objects and the unit identification component 412 can identify a controller that can hold the object tasks. This can be both general identification (e.g., there is one object that cannot be held by a controller, so another controller is located that can hold one object) as well as specific identification (e.g., finding a controller that is best at holding the task object not held). The unit identification component 412 can function as means for identifying at least one unit to use in assistance with the controller toward holding the task objects if it is determined that the controller cannot hold the task objects. An operation development component 414 can determine how a layout should be constructed, what criteria should be used in determining how to construct the layout, make observations and adjust how the construction is determined, and the like. The operation development component 414 can operate as means for developing operation of a means for constructing such that the layout attempts to have the task operate at improved performance. A layout construction component 416 can build the layout in accordance with a manner prescribed through the operation development component 414. The layout construction component 416 can function as means for constructing a layout to compensate for deficiencies of the controller if it is determined that the controller cannot hold the task objects, the layout includes at least one identified unit.

A test management component 418 can facilitate evaluation of the layout to determine if the layout functions properly, functions as anticipated (e.g., the layout component 410 predicts how a layout operates), and the like. A layout testing component 420 can perform tests on the layout, such as running a diagnostic test, running a simulation or real world events, observing operation after implementation to appreciate an error, and the like. The layout testing component 420 can operate as means for testing the layout to determine if there are errors. If an error is determined, then an error resolution component 422 can attempt to correct the error. According to one embodiment, a determination can be made on if the error resolution component 422 should operate (e.g., there is a minor error, but it is not worth expending resources to correct the error). The error resolution component 422 can implement as means for resolving the identified errors. In addition, if a controller cannot handle at least a portion of task objects, then a user notification component 424 can transfer a message to a personal electronic device that an error occurred. The message can solicit the user for a response on how to proceed, provide an interactive interface to facilitate problem correction, provide a suggested alternative (e.g., ask a user to approve use of the layout component 410), and the like. The user notification component can operate as means for notifying a user that the controller cannot handle an object if it is determined that the controller cannot hold the task objects.

Figure 5:
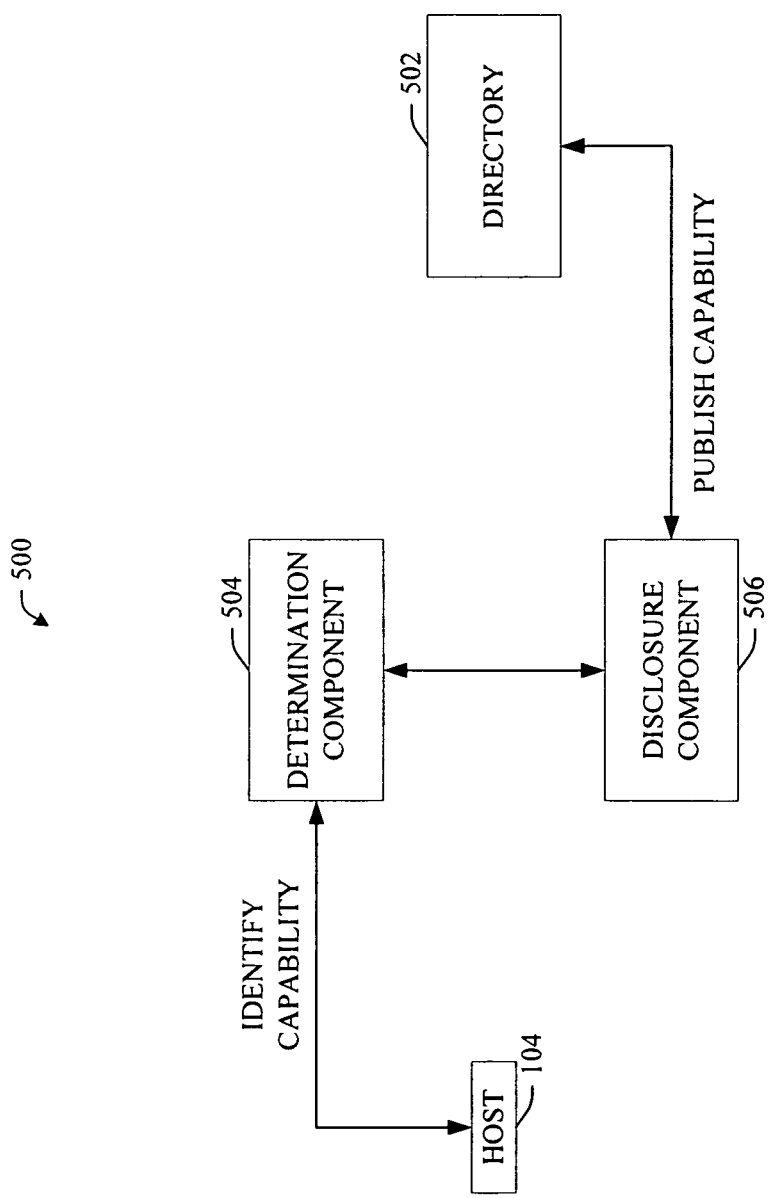
FIG. 5 illustrates a representative system for capability or operational requirement disclosure in accordance with an aspect of the subject specification.

Now referring to FIG. 5, an example system 500 is disclosed for disclosing capabilities of a host 104 and/or object operational desires in a directory 502. It can be beneficial to keep a directory 502 of capabilities of hosts—when an object is to use a host to operate, a quick check to the directory can allow the object to find a suitable host. This can be quicker than individually analyzing hosts each time an object is to operate. Likewise, there can be benefit to disclosing operational needs of objects in the directory 502 and/or outstanding operational needs. If there are outstanding operational needs listed in the directory, when a new host enters the system 500 and/or a capability of the host is modified, then the host 104 can check a capability satisfies the need. Additionally, a manager component (e.g., part of the determination component 504) can function such that hosts and needs can be paired in an efficient manner across an industrial control configuration. Being able to quickly ascertain needs and capabilities through the directory 502 (e.g., centralized directory, distributed directory) can allow the manger component to continuously update bindings.

To learn information for population into the directory, a determination component 504 can identify at least one capability of the host 104. In addition, the determination component 504 can identify at least one operational requirement of an object. A check can be run to determine if the identified capability or requirement is already in the directory 502 and/or if what is represented in the directory differs from what is identified. If there is no change in a state and what is in the directory, then the determination can stop further operation from other components to save resources.

A disclosure component 506 can publish at least a portion of the at least one identified capability such that the capabilities can be accessed by an object as well as other industrial control configuration entities. Conversely, the disclosure component 506 can publish operational requirement information as well as other data in the directory. Publication of information can include placing new information in the directory 502 as well as replacing outdated information.

In an alternative embodiment, a subscription service can be used. When a change is made to information (e.g., there is a new host, a host is modified, an object leaves the configuration, etc.), an entity such as an object can be automatically notified of this change. This can be of all changes as well as performed through specific changes (e.g., an object is notified when there is a modification to a host upon which the object binds). The subscription service can implement such that the directory is checked for changes and changes are disclosed to entities.

Figure 6:
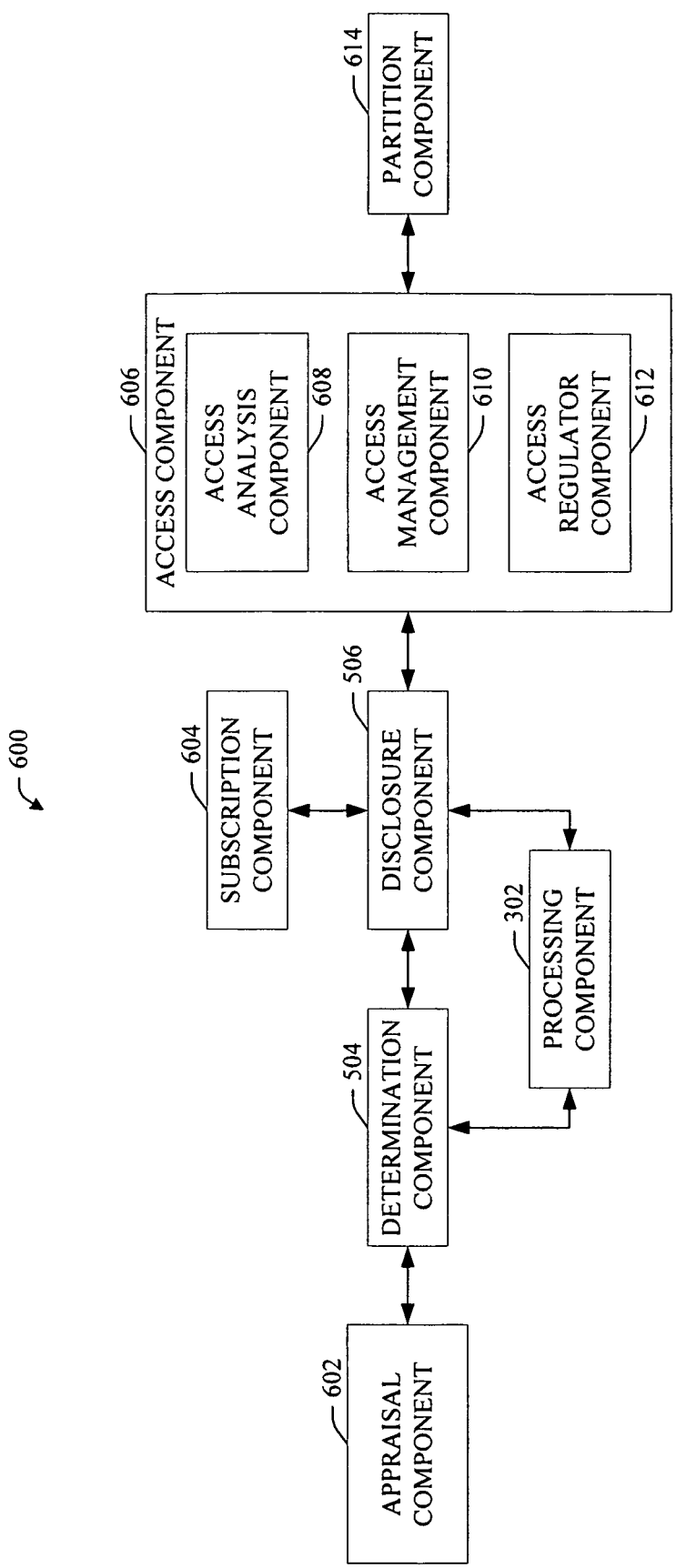
FIG. 6 illustrates a representative system for communicating information through a directory in accordance with an aspect of the subject specification.

Now referring to FIG. 6, an example system 600 is disclosed for using a directory to communicate information pertaining to an industrial control configuration. While specific functionality is disclosed for publishing a capability of a host, it is to be appreciated that aspects can relate to publication of other information, including that of an object operational need. An appraisal component 602 can evaluate at least one identified capability, a result of the evaluation can be used to determine if the identified capability should be published. A determination component 504 and disclosure component 506 can be used to facilitate population of the directory. Moreover, a processing component 302 can provide additional functionality to the system 500. A subscription component 604 can be used that updates a changed capability to an entity that previously appreciated the publication (e.g., performs subscription tasks in accordance with aspects disclosed herein).

Sensitive information can be placed into the directory, such as proprietary information, and an access component 606 can be used to regulate access to the directory information. An access analysis component 608 can be used that evaluates an entity that requests to access the at least one identified capability and/or place information in a directory. The evaluation can be performed to ascertain why a request is made, a user that supplied the request, contextual information related to the request (e.g., an unusual number of requests are made in a relatively short amount of time), etc. An access management component 610 can be used that determines if the entity is allowed to view the identified capability. The determination can be based upon access rights, historical information (e.g., of the requestor, of the configuration, and the like), through approval provided by a user, a security level of the capability, a security level of the object, or a combination thereof, as well as based on other criteria. An access regulator component 612 can enable the entity to view the publication (e.g., complete directory access, limited access, and the like) if it is determined that the entity is allowed or denies access to the publication if it is determined that the entity is not allowed. In addition to viewing the publication, the access regulator component 612 can enable information to be copied, forwarded, and the like.

It is possible that some information should be published while other information should protected (e.g., not published). For instance, a capability of the host should be published, while another capability and a host location should not be published. A partition component 614 can be used that determines at least one capability that should be published and at least one capability that should not be published based upon a result of the evaluation, the disclosure component publishes the capability determined to be published and masks the capability determined not to be published.

Figure 7:
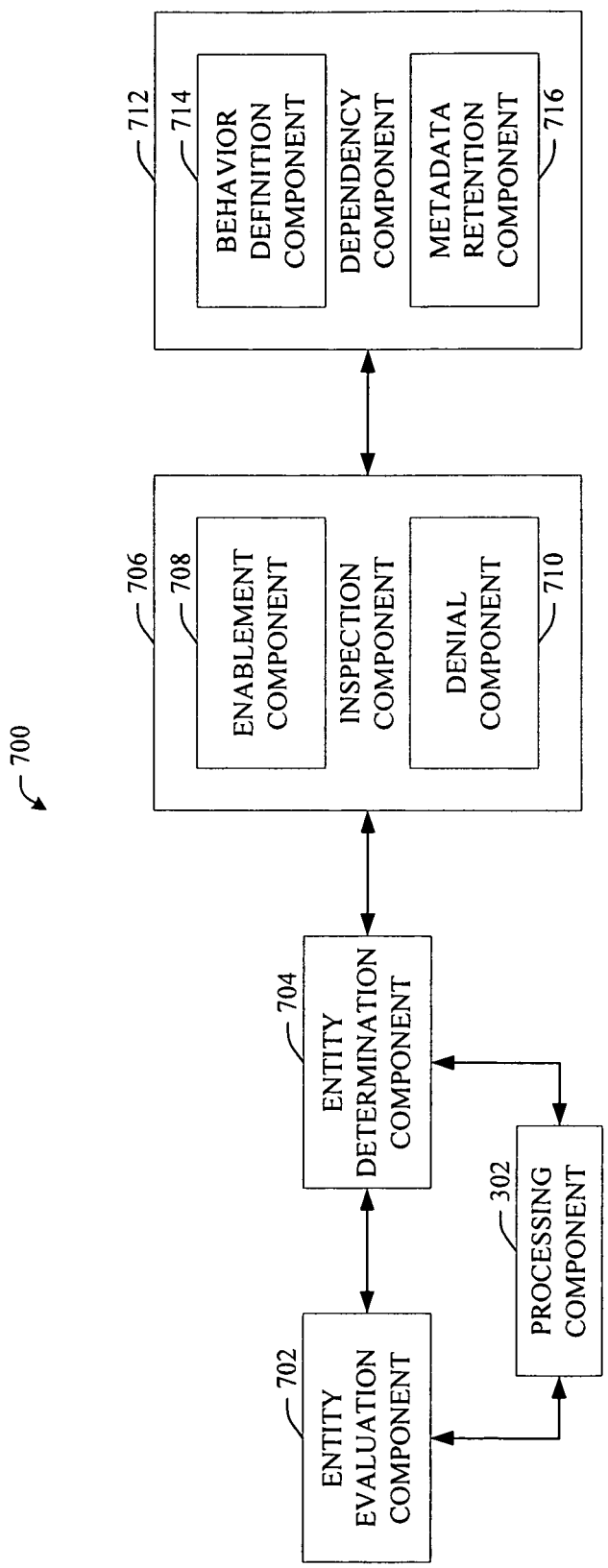
FIG. 7 illustrates a representative system for request response management in accordance with an aspect of the subject specification.

Now referring to FIG. 7, an example system 700 is disclosed for responding to requests made to learn about industrial control configuration entities (e.g., hosts, objects) and characteristics of those entities (e.g., capabilities, operational needs, etc.). An entity evaluation component 702 can identify a request to appreciate information, collect metadata pertaining to a requesting entity, and evaluate the collected metadata. The entity evaluation component 702 can operate as means for evaluating an entity that requests to appreciate at least one capability of a host or at least one operating requirement of an object. Based upon the evaluated metadata, an entity determination component 704 can determine if access should be granted (e.g., full access, restricted access, etc.), access should be denied, a user should be solicited to approve the request, etc. The entity determination component 704 can function as means for determining if the entity is allowed to view at least one capability of the host or at least one operating requirement of the object. According to one embodiment, the means for determining makes the determination based upon access rights of the entity, a security level of capability, a security level of the object, or a combination thereof. A processing component 302 can be employed to provide additional functionality to the system 700.

Inspection component 706 can facilitate allowing an entity to view information or deny a request. An enablement component 708 can allow access (e.g., provide access rights, provide a password, remove a restriction, and the like). The enablement component 708 can operate as means for enabling the entity to appreciate at least one capability of the host or at least one operating requirement of the object if it is determined that the entity is allowed. However, if there should not be access, then a denial component 710 can operate. The denial component 710 can implement as means for denying access to the at least one capability of the host or at least one operating requirement of the object if it is determined that the entity is not allowed. Denial can be outright as well as continuous (e.g., initially deny until an action takes place, such as a password is provided).

A dependency component 712 can be used to manage a dependency of an object. A client application can engage the object and a behavior definition component 714 can define behavior of the object. The behavior definition component 714 can function as means for defining external behavior supplied to at least one client application engaging the object. Information can be stored by a metadata retention component 716 that pertains to the object. The metadata retention component 716 can operate as means for retaining metadata pertaining to at least one dependency of the object.

Figure 8:
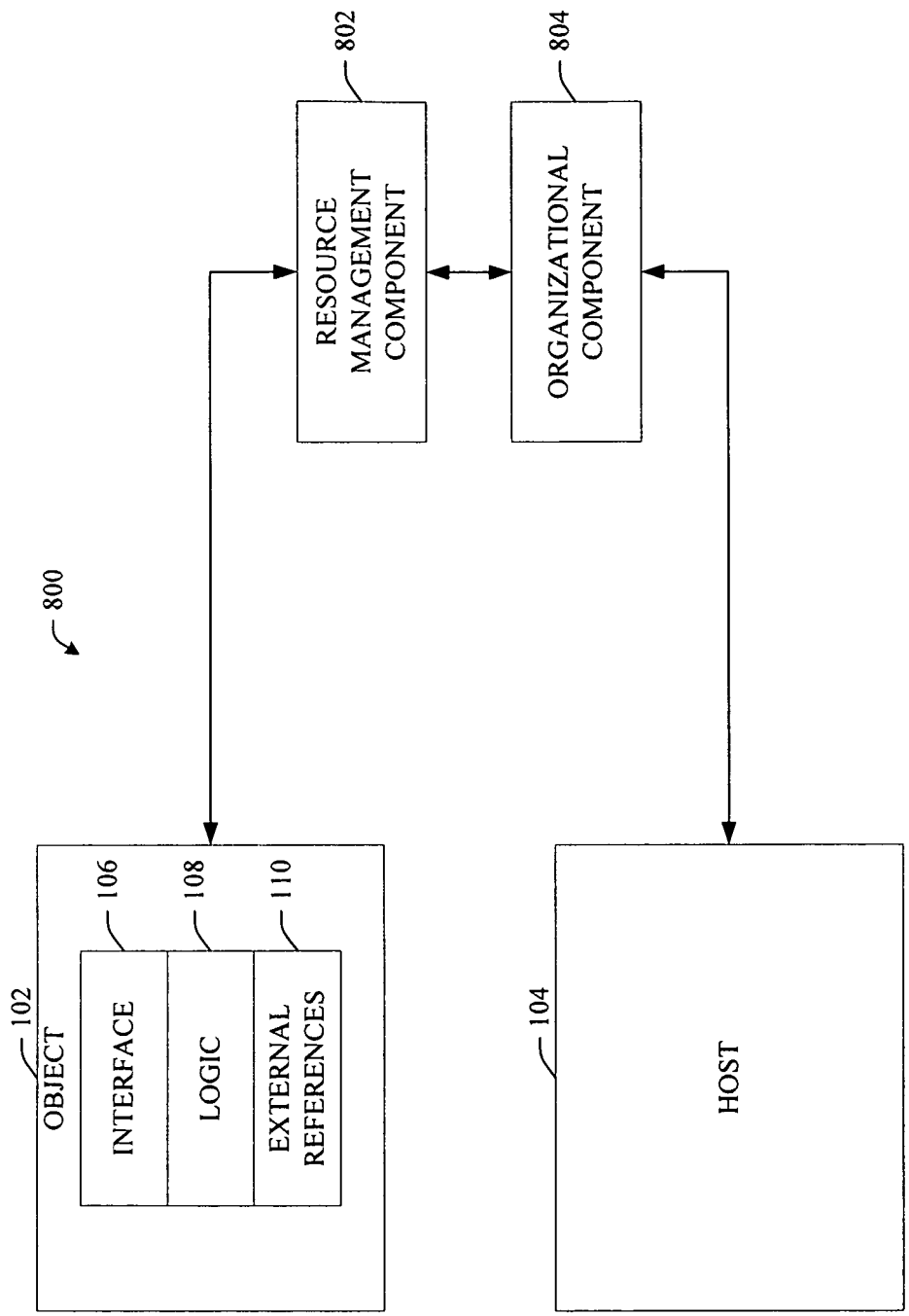
FIG. 8 illustrates a representative system for resource management in accordance with an aspect of the subject specification.

Now referring to FIG. 8, an example system 800 is disclosed for managing resources in an industrial control configuration. An object 102 can be part of the system 800, where the object commonly uses an interface 106, logic 108, external references 110, or a combination thereof. To facilitate operation, the object 102 can bind with a host 104 such that the object 102 exploits at least one capability of the host.

Matching can occur where a capability is assigned to an object. However, in more complex environments it can be beneficial to have a larger management presence regarding binding objects and hosts. For example, there can be a host with a relatively rare capability (e.g., relatively large memory) and many objects can have an operational requirement of large memory. If all the objects bind with the host, the host can run at a slow rate, the host can fail due to not being able to handle all the objects, and the like. Therefore, an overarching management can be employed to determine what objects can bind with a host, when an object can use a host, a priority order of objects, and the like.

A resource management component 802 can determine what resources are needed for an object to operate according to a manner (e.g., needed for any operation, needed for a particular operation style, needed to run at a most efficient rate, etc.). The resource management component 802 can collect information on hosts that are available and capabilities of those hosts. This can be done for a relatively large number of objects and a check can be performed on if an industrial control configuration has enough resources (e.g., provided through hosts) to meet the demands of the objects.

An organizational component 804 can pair the object with a host in an attempt to meet the resource need. Pairing can occur randomly, based upon a prediction facilitated by at least one artificial intelligence technique, through designation from a user, or a combination thereof, as well as through other implementations. To improve operation, the organizational component 804 can delete bindings among objects and hosts and create new or different pairings to meet various resource needs. In one example, an original object can bind with a host that has a higher capability than needed. If a second object should be bound that needs the higher capability, then the organizational component 804 can delete the binding with the host for the original object, make a new binding with another, less capable host, and create a new binding for the second object and the capable host.

Figure 9:
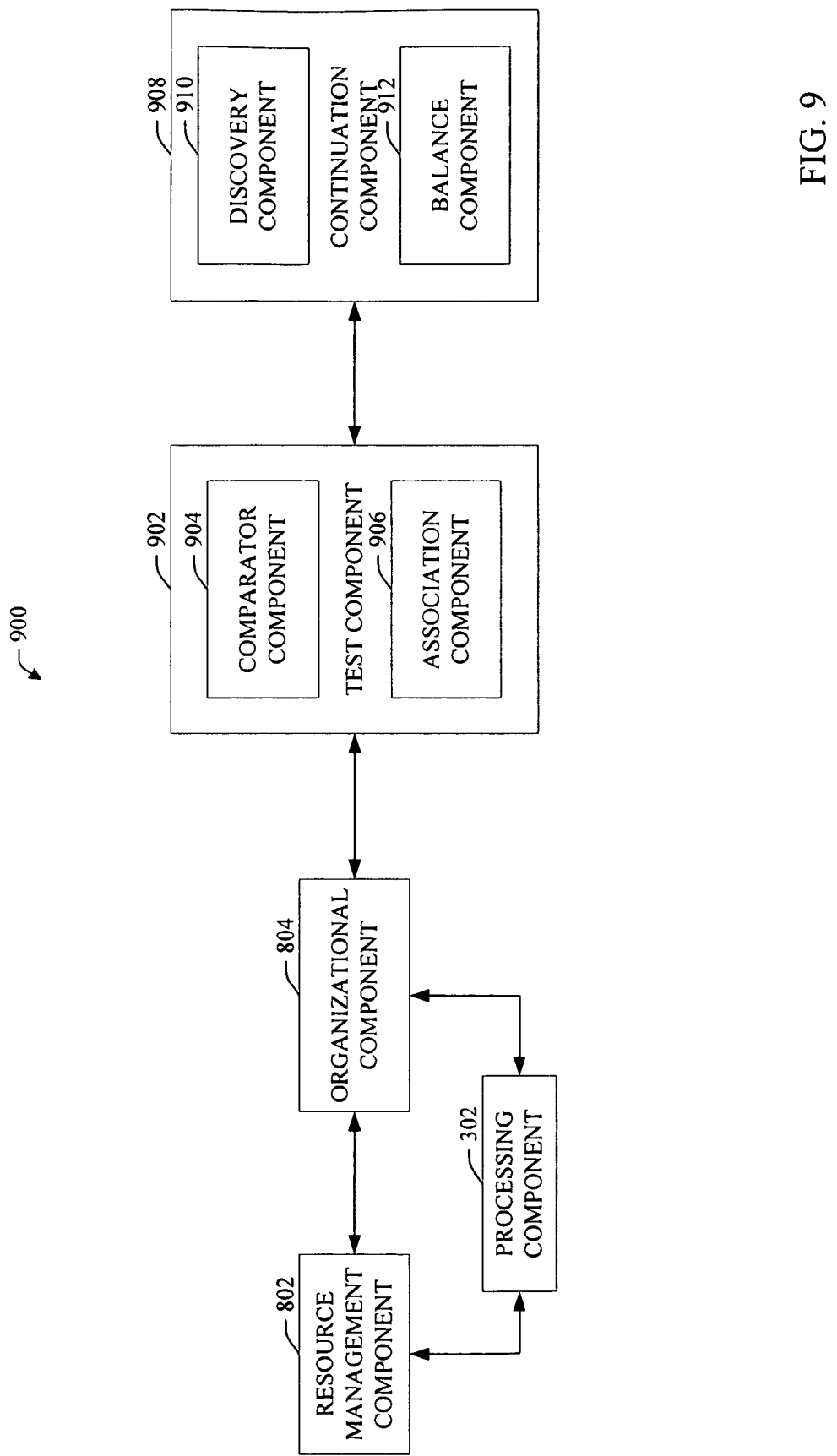
FIG. 9 illustrates a representative managing host or object resources in accordance with an aspect of the subject specification.

Now referring to FIG. 9, an example system 900 is disclosed for managing resources related to an industrial control configuration, specifically relating to objects and/or hosts. The system 900 can use a resource management component 802 and an organizational component 804 to organically group hosts and objects together based upon capabilities and operational needs. A processing component 302 can be used by the system 900 to improve operation.

A test component 902 can determine if there is a resource need not met for an object and attempt to correct the deficiency. A comparator component 904 can identify at least one resource deficiency of the host relating to the object operating according to the manner. For example, to operate in a desirable manner, the object can have an operational requirement that a host be able to generate an image in color. If there is not a host that has color capabilities and/or the host is not set to disclose color images, then there is a deficiency. The comparator component 904 can attempt to correct the deficiency (e.g., change a setting of a host from non-color to color). An association component 906 can be used that automatically matches the object with the host if it is determined that at least one resource need is met.

However, it is possible that the test component 902 cannot cure the deficiency and an object continues with an operational requirement not met. Therefore, a continuation component 908 can be used to monitor the configuration to determine if a change occurs that has potential to meet the need (e.g., a new host is added). If a change does occur, the continuation component 908 can instruct the organizational component 804 to alter bindings.

Conversely, the continuation component 908 can monitor for new objects entering the configuration. A discovery component 910 can be employed that determines that there is a newly added modular object to the configuration, the resource management component 802 can determine resource needs of the newly added modular object. The continuation component 908 can employ a balance component 912 that determines if the match made by the association component should be broken based upon the operational need of the newly added modular object. Once broken, a host can be reassigned to the newly added object.

Figure 10:
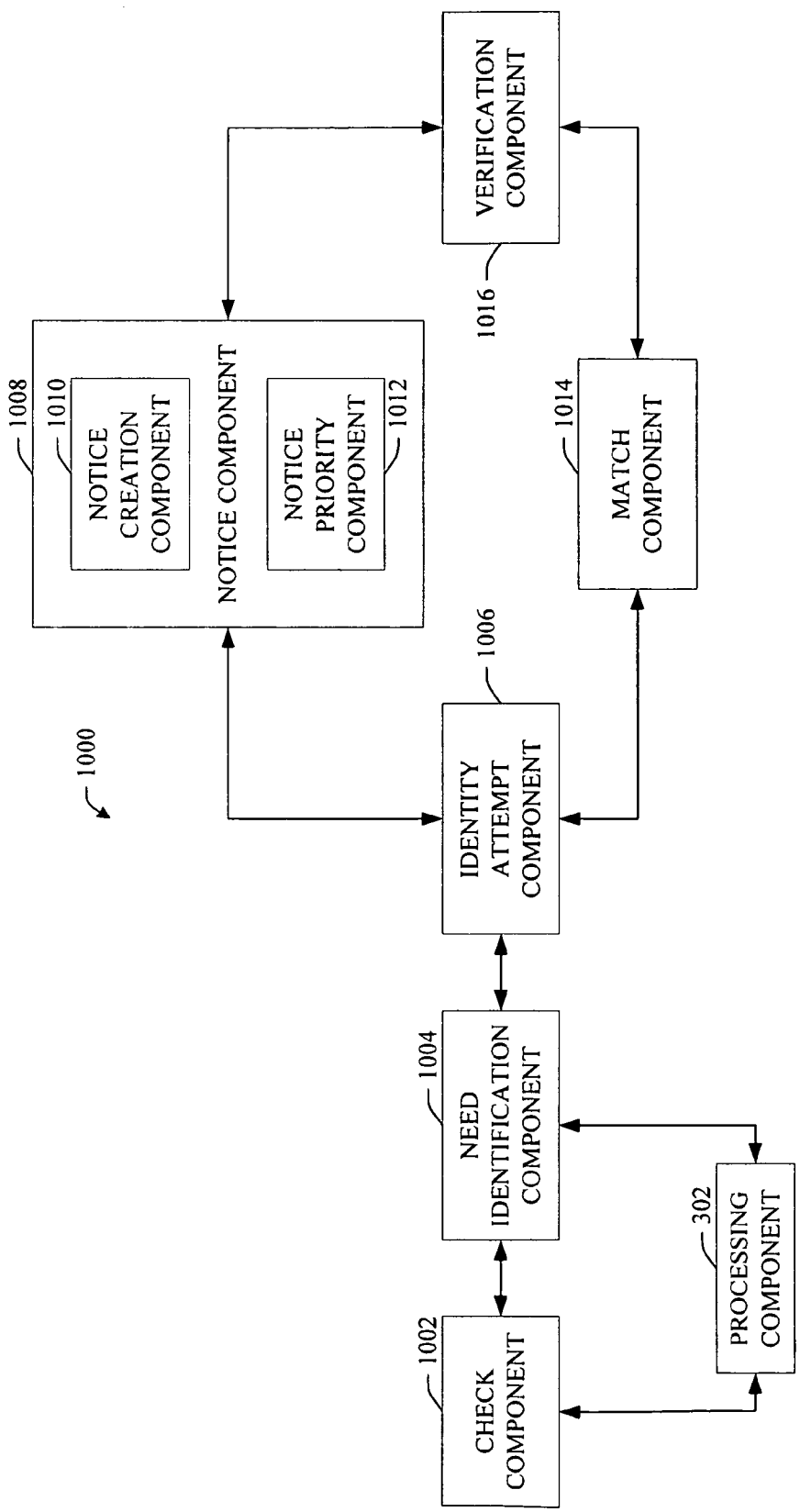
FIG. 10 illustrates a representative system for meeting an operational need of an object in accordance with an aspect of the subject specification.

Now referring to FIG. 10, an example system 1000 is disclosed for attempting to meet an operational need of an object. A group component 204 of FIG. 2 can attempt to group an object with one or more hosts to meet operational needs—however, it is possible that all operational need cannot be met. A check component 1002 can be employed to determine if there is a need not met after operation of the grouping component. The check component 1002 can operate as means for determining that a modular object of the configuration has an operational need not met. Once it is determined that a need is not met, then a need identification component 1004 can ascertain the need that is not met. The need identification component 1004 can function as means for determining the operational need not met. An identify attempt component 1006 can search for newly added hosts and/or undiscovered hosts in an attempt to find a match for the object that satisfies the need. The identity attempt component 1006 can function as means for attempting to identify a host that can satisfy the operational need that is not met.

A notice component 1008 can attempt to use a notice to facilitate meeting an operational need. A notice creation component 1010 can generate a message to be used by the system that a need is not met. A servers (e.g. centralized, distributed) can use the notice to attempt to quickly resolve the deficiency upon a host entering the configuration. The notice creation component 1010 can operate as means for creating a notice that a host is desired if the means for attempting to identify does not find a suitable host, the notice facilitates newly entering or modified hosts to be evaluated in view of the operational need that is not met. It is possible that multiple objects have at least one operational need not met—sometimes even the same need. Therefore, a notice priority component 1012 can prioritize the notices to ensure a most important need is addressed first in time. Notice priority component 1012 can implement as means for prioritizing notices based upon more than one modular object having an equivalent need not met, such that the modular object associated with the higher prioritized notice gains first access to an available capability.

A determination can be made that a host includes a needed capability and a match component 1014 (e.g., grouping component) can automatically match a host and object together. The match component 1014 can operate as means for automatically matching the modular object with a host discovered to meet the operational need identified by the means for attempting to identify. A check can be performed by a verification component 1016 on if a successful match occurs. If a successful match does not occur, then the match component 1014 can attempt to perform the match again or attempt to create a new match. The verification component 1016 can implement as means for verifying a newly added host, upon verification of the newly added host the means for attempting to identify operates again.

Figure 11:
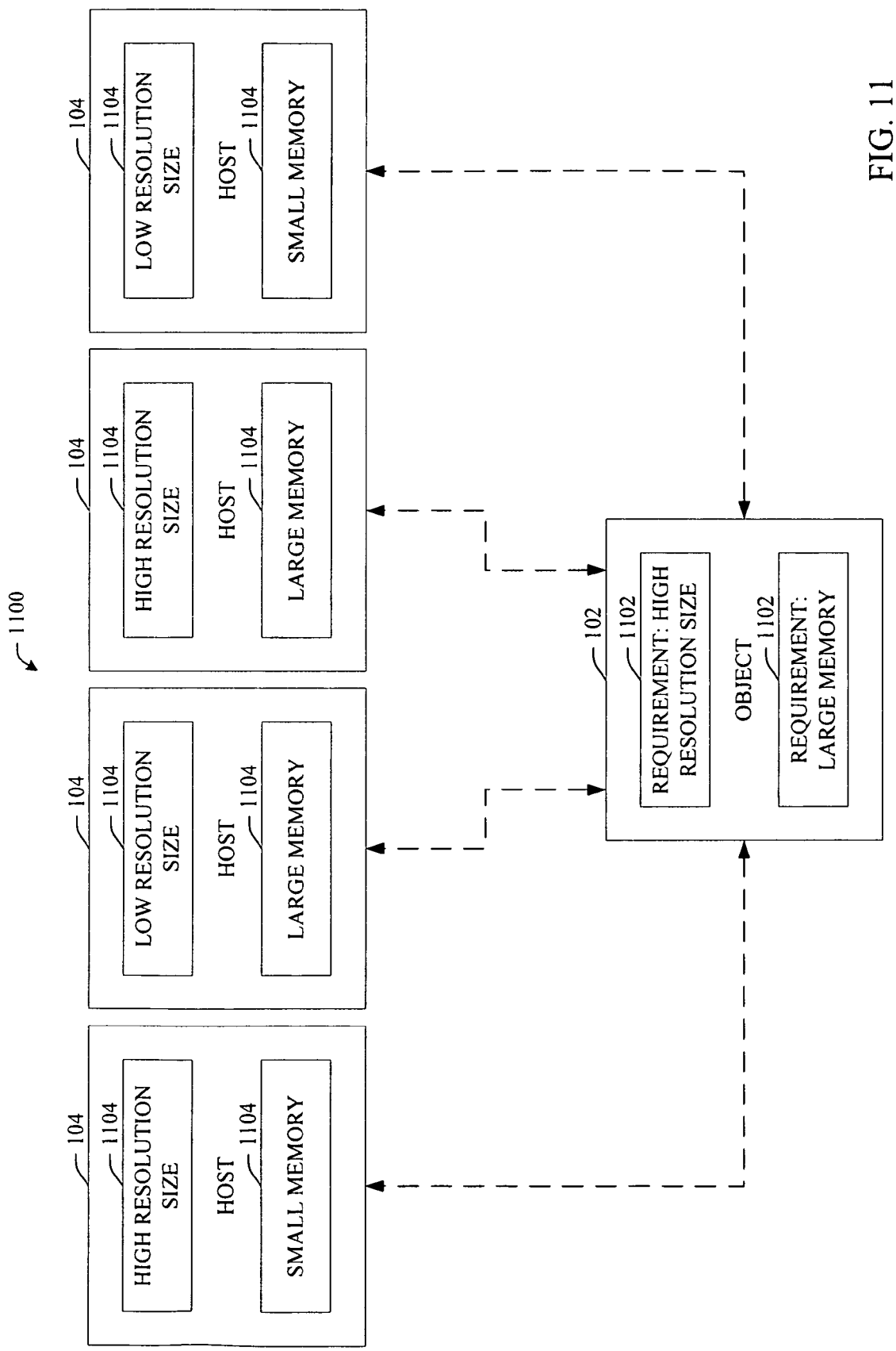
FIG. 11 illustrates a representative configuration for matching hosts and objects in accordance with an aspect of the subject specification.

Now referring to FIG. 11, an example system 1100 is disclosed for expressing matching among hosts 104 and an object 102. The object 102 can have operation requirements 1102—for example, the requirements can be that a host has a high resolution size and a large memory. Hosts 104 can have different capabilities 1104 that can be exploited by the object 102. A binding (represented with a dotted line) can be created with a host in an attempt to match the operational requirement with an appropriate capability or just to create a binding in case the binding becomes appropriate. If more than one host matched a need, then multiple bindings can be created or selection can occur and one binding be used. If there is not a match, then an error message can be generated or continuous observation can occur to determine if a host enters or is modified to meet the operational requirement.

In example operation, it can be desirable that a minimum number of bindings be created. Therefore, the object 102 binds with the host 104 that has capabilities 1104 of high resolution size and large memory. In an alterative embodiment, since multiple hosts meet at least one requirement, it can be beneficial not to become overly dependent upon one host 104. Therefore, bindings can be created with all hosts that match at least one operational requirement 1102.

Figure 12:
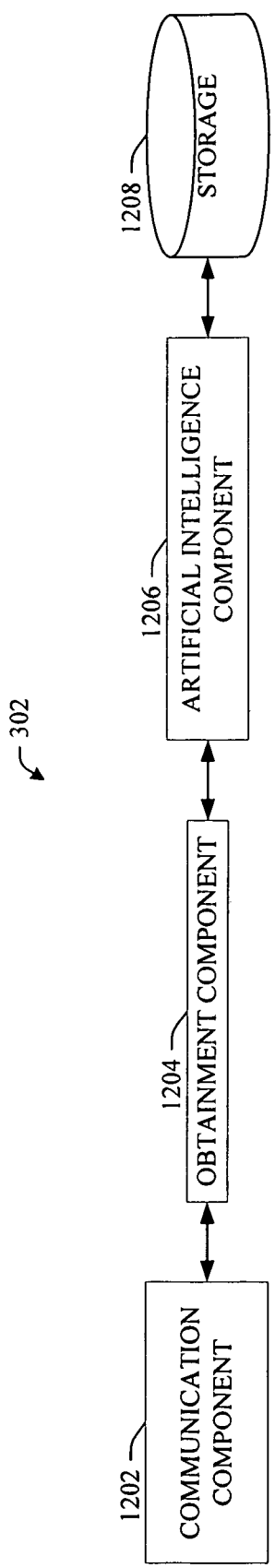
FIG. 12 illustrates a representative processing component in accordance with an aspect of the subject specification.

Now referring to FIG. 12, an example processing component 302 is disclosed for providing various functionality to components and aspects disclosed herein. To facilitate operation, the processing component 302 can use a communication component 1202 that can engage with other devices to transfer information, such as to send a request for metadata, receiving metadata from an auxiliary source, etc. Operation can take place wirelessly, in a hard-wired manner, employment of security technology (e.g., encryption), etc. Additionally, metadata transfer can be active (e.g., query/response) or passive (e.g., monitoring of public communication signals). Moreover, the communication component 1202 can use various protective features, such as performing a virus scan on collected metadata and blocking metadata that is positive for a virus.

An obtainment component 1204 can gather information (e.g., host capabilities, operational requirements, etc.) from various locations, including collecting a notice that an object leaves a configuration, determining if a host is bound to another object, and the like. Filtering can be practiced, such that only information likely to be relevant is collected, information from more reliable sources is gathered first, a limited amount of data (e.g., based upon storage size) is collect, as well as other filtering types.

An artificial intelligence component 1206 can be used in performance of various determinations and/or inferences. It is to be appreciated that artificial intelligence techniques can be used to practice determinations and inferences disclosed in the subject specification. The artificial intelligence component 1206 can employ one of numerous methodologies for learning from data and then drawing inferences and/or making determinations related to dynamically storing information across multiple storage units (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. In addition, the artificial intelligence component 1206 can also include methods for capture of logical relationships such as theorem provers or more heuristic rule-based expert systems. The artificial intelligence component 1206 can be represented as an externally pluggable component, in some cases designed by a disparate (third) party.

Different pieces of information, such as collected metadata, component operating instructions (e.g., communication component 1202), source location, components themselves, etc. can be held on storage 1208. Storage 1208 can arrange in a number of different configurations, including as random access memory, battery-backed memory, hard disk, magnetic tape, etc. Various features can be implemented upon storage 1208, such as compression and automatic back up (e.g., use of a RAID configuration). In addition, storage 1208 can operate as memory that can be operatively coupled to a processor. The storage 1208 can function as a computer-readable medium upon which a computer program can be embodied.

For example, a computer program can include program code for evaluating an application designated for operation in conjunction with the industrial control configuration. In addition, the computer program can include program code for attempting to identify a host that can operate upon the application based upon a result of the evaluation. In another example, the computer program can include program code for evaluating a host to determine at least one hosting capability as well as program code for presenting at least one determined hosting capability (e.g., presenting to a user, presenting to an entity, presenting to a directory, and the like).

Moreover, the computer program can include program code for evaluating pieces of an object instance that require computing resources to execute and program code for binding at least a portion of the pieces to the computing resources based upon a result of the analysis. The computer program can also include program code for enabling a user to separate the binding from a physical control or information system through use of a logical view as well as program code for deploying the logical view to multiple physical systems.

Figure 13:
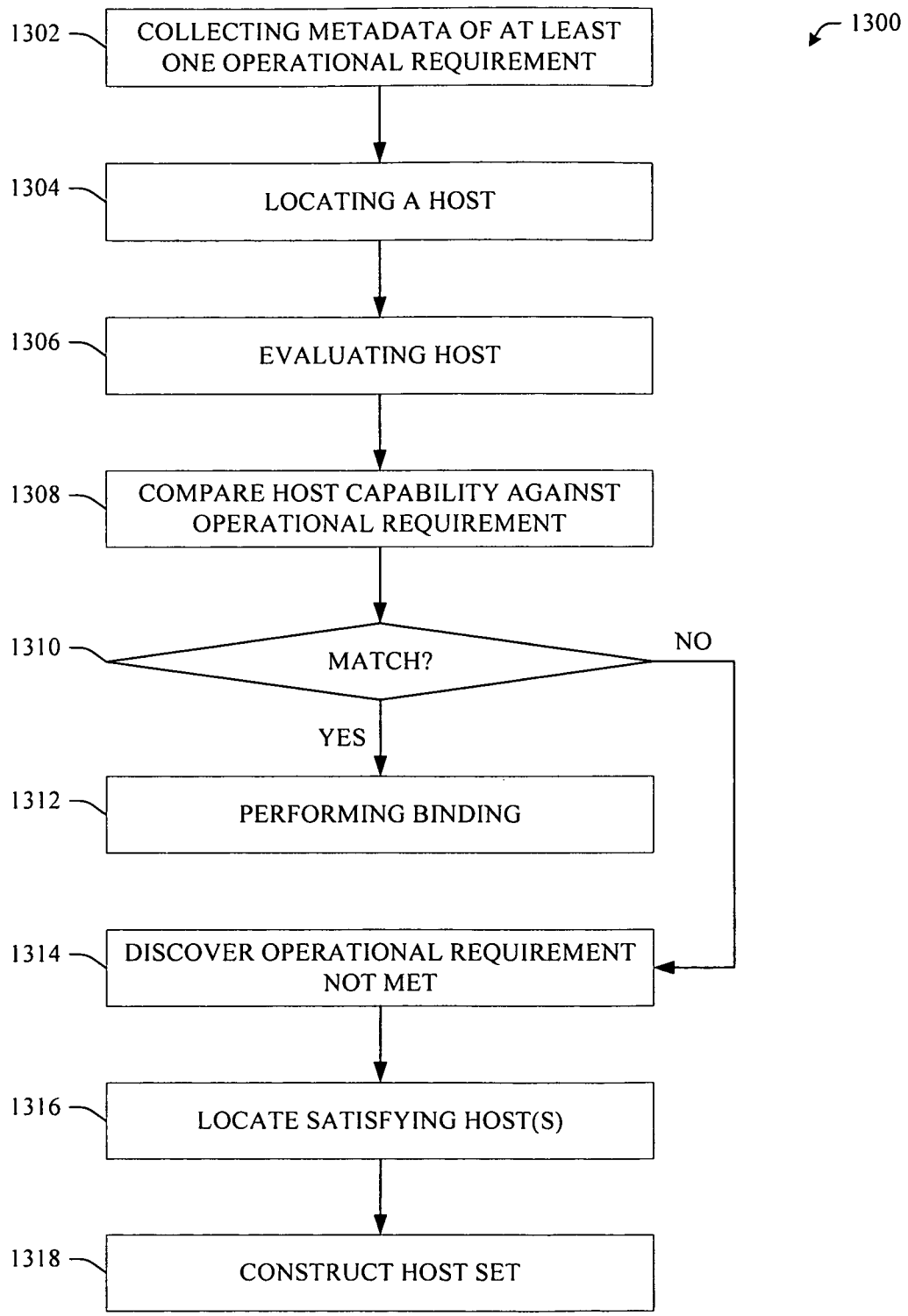
FIG. 13 illustrates a representative methodology for checking if a host meets an operational requirement in accordance with an aspect of the subject specification.

Now referring to FIG. 13, an example methodology 1300 is disclosed for determining if a host meets an operating requirement of an object. Metadata pertaining to at least one operational requirement of the object can be collected at action 1302. Example metadata can include what the operational requirement is, if the operational requirement is critical, etc. The operation requirement can be required (e.g., operation does not occur without requirement being met), critical (e.g., there is a change of failure occurring if not met), preferred (e.g., desireable to have requirement met), optional (e.g., discretionary to a user), or a combination thereof (e.g., critical in one aspect, preferred in another aspect).

The metadata can be evaluated and a host that has potential to meet the operational requirement can be located at act 1304. Thus, act 1304 can function as locating at least one host that meets an unsatisfied operation requirement and that can be used in conjunction with the compared host. Host locations can be accessed from a configuration directory (e.g., distributed directory), from a response to a broad request to hosts, as well as through other manners.

The located host can be evaluated at event 1306 in order to ascertain characteristic metadata. A comparison can occur between at least one host and the object at action 1308. Action 1308 can implement as comparing at least one capability of a host against at least one operation requirement of an industrial modular object (e.g., comparing metadata collected concerning the object and learned from evaluating the at least one host).

A check 1310 can be performed that determines if the host satisfies the at least one operational requirement. If there is a match, then action 1312 can be performed, which can include linking the host to the industrial modular object if it is determined that the host satisfies the operation requirement. With performing the binding, there can be determining a contextual situation of the linkage (e.g., determining why a exists). There can be modifying logic associated with the industrial modular object based upon contextual situation of the linkage with action 1312. For example, modifying the logic can include aggregating data with the industrial modular object or transforming the logic. For example, when binding to a training or test system, logic can be aggregated with simulation or unit testing "scripts" to emulate hardware or software pieces of system. Additionally, for software objects a system can be able to transform the logic of an object to better fit a host capability (e.g. a language transforms from C# to Java or vice versa).

However, if there is not a match then there can be discovering what operation requirement is not satisfied if it is determined that the host does not satisfy the operation requirement at act 1314. For example, this can be accomplished though performing a direct enquiry upon an object. A search can be performed and based upon the search there can be locating a satisfying host at act 1316. Therefore, more than one host can be used to satisfy operational requirements of an object. At action 1318, there can be constructing a set of hosts that can be used to satisfy the operation requirement, the set of hosts includes the compared host and at least one located host. If at act 1316 it is determined that there is not a host that can satisfy, then a determination can be made if a host can be modified to match the operational requirement and if there is a positive result then there can be modifying a capability of the host to meet the operational need if it is determined that the host does not meet the need.

Figure 14:
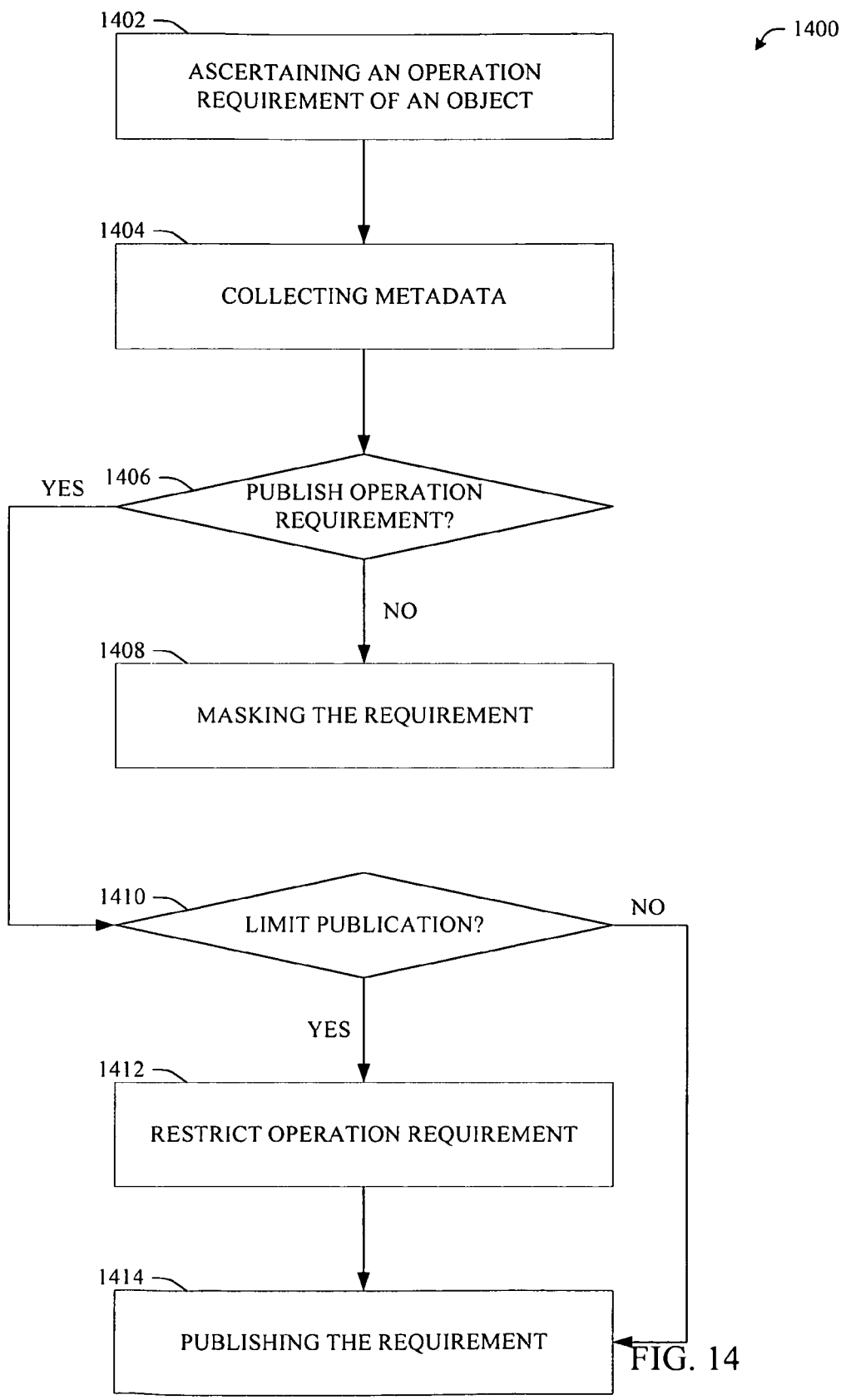
FIG. 14 illustrates a representative directory management methodology in accordance with an aspect of the subject specification.

Now referring to FIG. 14, an example methodology 1400 is disclosed for managing a directory that can include host capability information, object operational requirement information, and the like. At event 1402, there can be analyzing an object to ascertain an operating requirement of the object. A direct request can me made to the object for the requirement, analysis of operational code can be performed, and the like. Metadata can be collected at act 1404 pertaining to context of the operational requirement (e.g., metadata on network security, security level associated with the operational requirement, etc.).

A check 1406 can be performed determining if the operating requirement of the object should be published based upon a result of the analysis. The determination can be based upon access rights of an entity anticipated to access the publication, anticipated reproduction of information by the entity, likelihood of the publication being compromised, or a combination thereof, as well as on other factors. If it is determined that publication should not occur, then the methodology 1400 can continue to action 1408 for masking the operating requirement if it is determined that publication should not occur. Publication can include adding information in a directory, allowing information to be discoverable, etc.

If publication should occur, then a check 1410 can be performed determining if there should be a restriction on publication if it is determined that publication should occur. If restriction should occur, a manner for restriction can be determined (e.g., inferred from contextual information, from user instruction, and the like), and restriction can occur at act 1412. Then publishing the operating requirement with the restriction can occur at action 1414. According to one embodiment, publication is restricted such that there is an authorization check before an entity can access the published operating requirement.

However, it is possible that the check 1410 can determine there should be no limitation on the publication. Therefore the methodology 1400 can move from the check 1410 to action 1414 for publishing the operating requirement if it is determined that publication should occur. The publication can implement such that the publication is to a directory and once published an authorized entity can access published information.

Figure 15:
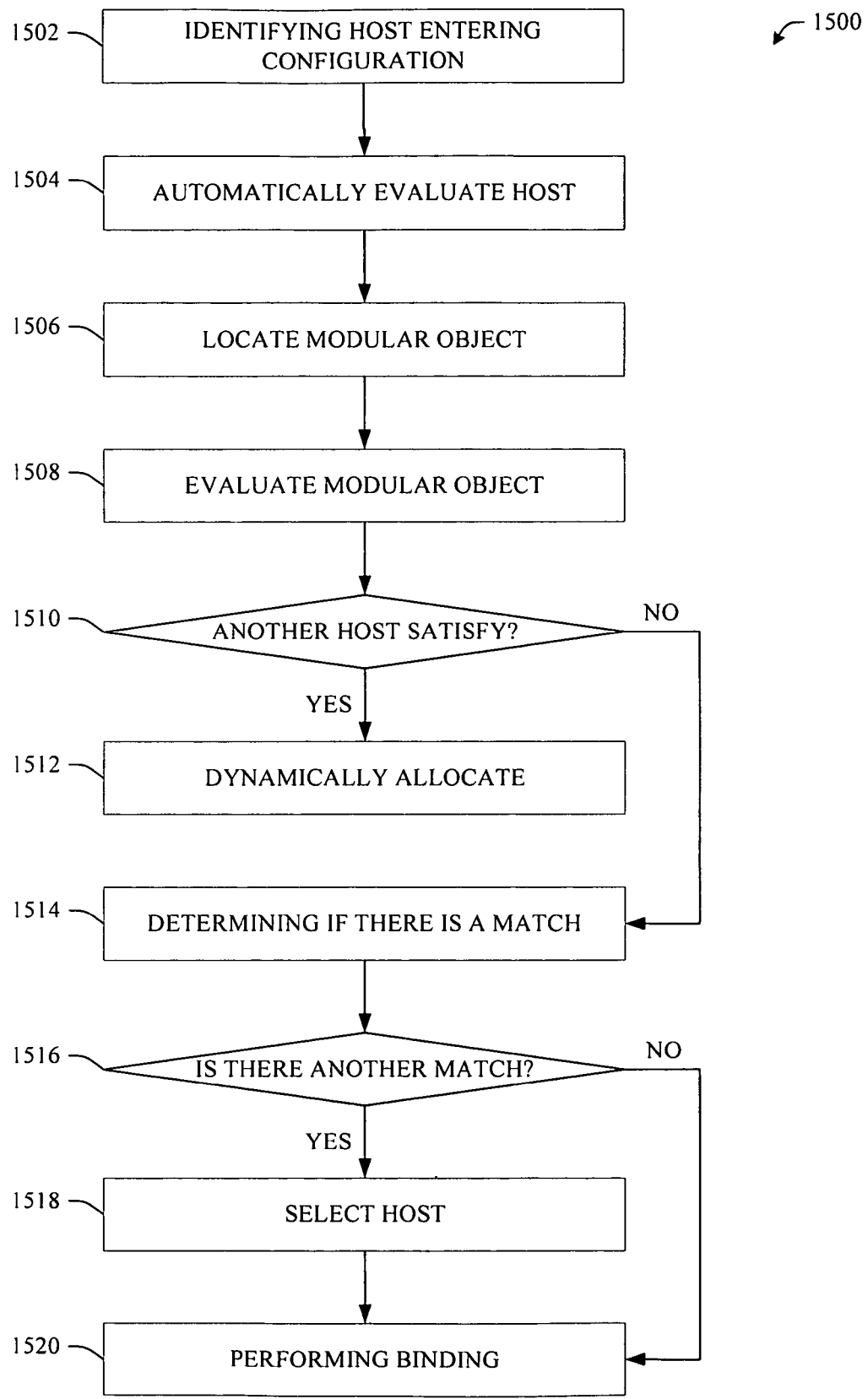
FIG. 15 illustrates a representative automatic host or object evaluation methodology in accordance with an aspect of the subject specification.

Now referring to FIG. 15, an example methodology 1500 is disclosed for automatic host and/or object evaluation, particularly upon entering or reentering an industrial control configuration. Metadata can be collected (e.g., through passive observation) pertaining to a change in a configuration. The metadata can be analyzed and a determination can be made at action 1502 that a host enters the industrial control configuration.

Upon the host entering the configuration, there can be automatically evaluating the host to determine at least one capability of the host at event 1504. A modular object can be located at act 1506 and evaluated at action 1508. Based upon the evaluation there can be accessing at least one operational need of a modular object through action 1508. A check 1510 can be implemented to determine if the need is satisfied by another host. It is possible that multiple hosts meets operational needs and an overall management can be used to properly place objects with hosts. At event 512 there can be dynamically allocating of objects to hosts (e.g., allocated to optimize operation) where one host is associated with an object to meet an operational need. More than one host can be associated, such as one host functioning as a primary and another as a secondary that is dormant unless the primary fails. Allocation can be an initial allocation as well as a re-allocation, which can be performed through use of an algorithm (e.g., artificial intelligence based load balancing algorithm).

Action 1514 can determine if a capability of the host fulfills the operational need of the modular object. A check 1516 can function determining if another host meets the operational need of the modular object. According to one embodiment, determining if a capability of the host fulfills the operational need of the modular object occurs upon a negative determination that another host meets the operational need. If there is another match, then there can be at action 1518 selecting one host to meet the operational need if more than one host is determined to meet the operational need. In addition, action 1518 can represent selecting one host to meet the operational need if more than one host is determined to meet the operational need. If there is not another match then the host can bind with the modular object 1520; likewise, a host selected at action 1518 can bind with the modular object at event 1520. While describing modular objects, it is to be appreciated that encapsulated objects can be used as well as other types of objects.

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks can occur in different orders and/or concurrently with other blocks from what is depicted and described herein. Moreover, not all illustrated blocks can be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 16:
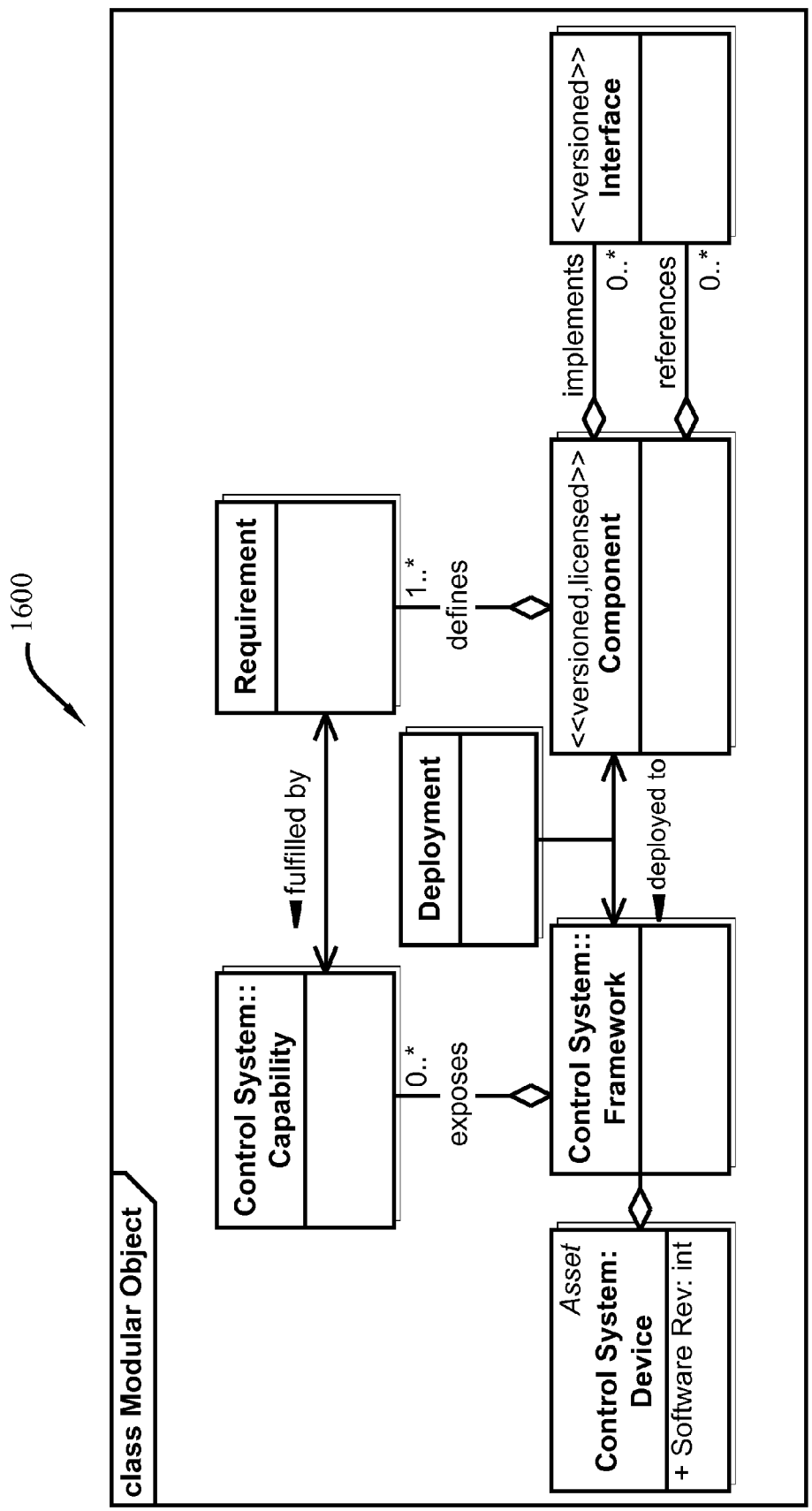
FIG. 16 illustrates a representative class diagram for a modular object in accordance with an aspect of the subject specification.
Figure 17:
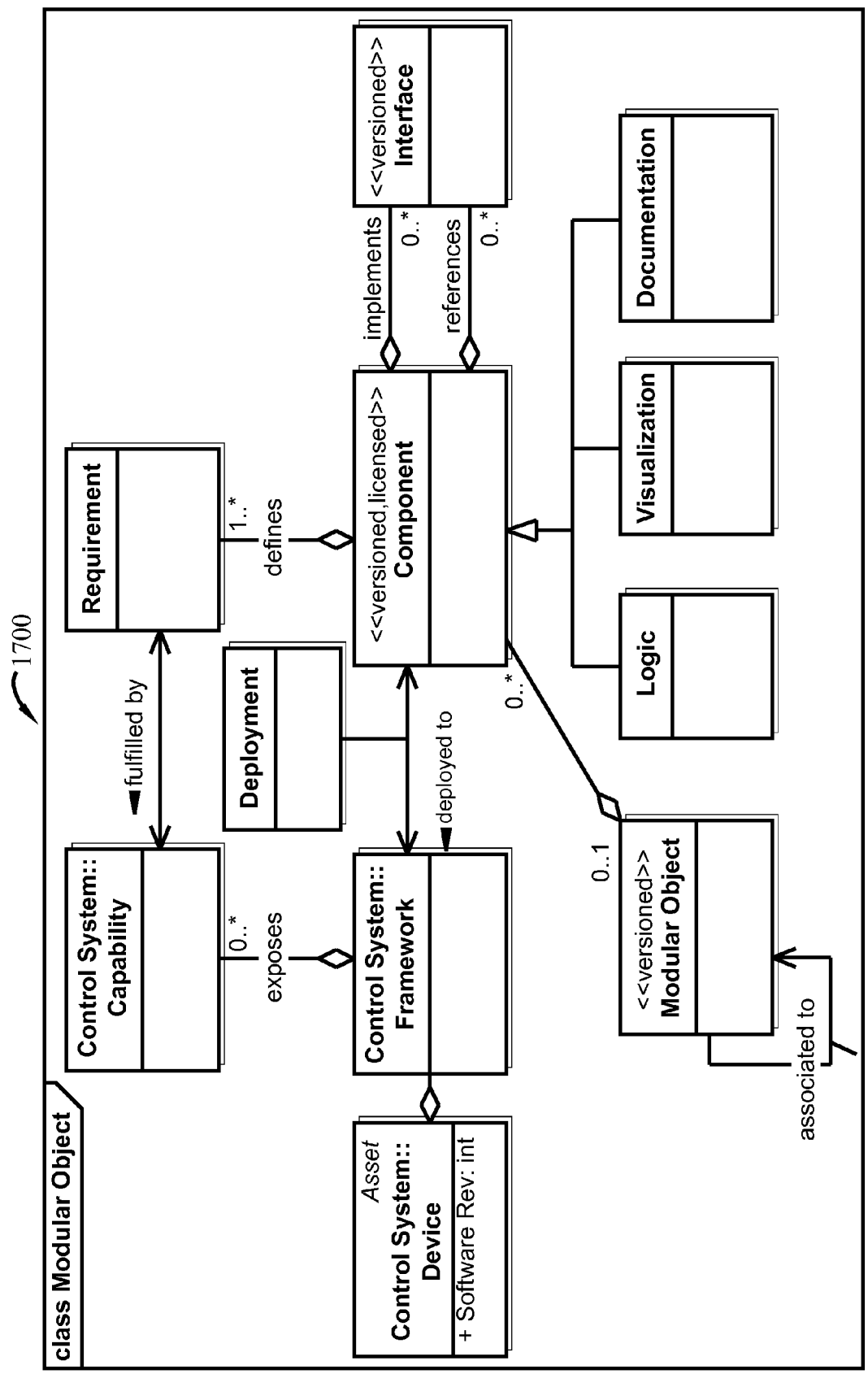
FIG. 17 illustrates a representative class diagram for a modular object in accordance with an aspect of the subject specification.

Now referring to FIG. 16 through 24, drawings are shown to provide further guidance regarding aspects disclosed herein. FIG. 16 through FIG. 24 and associated text is disclosed to provide example information in view of the disclosed innovation and therefore should not be construed to limit the innovation. FIG. 16 discloses an example configuration 1600 for an example class diagram of a modular object. FIG. 17 discloses an example configuration 1700 for example extensions to an example class diagram of a modular object.

A binding process commonly involves taking the pieces of an object instance that require computing resources to execute and assigning them to those computing resources. In some cases, higher level objects will also require the assignment of resources when they bind. At this point, the binding process still involves logical modular components and computing resources. A control system view commonly shows all of the logical computing resources available in the system. The use of a logical view of the computing resources allows the user to separate the bindings from the physical control and information system. In this manner, the user can later deploy this logical view to multiple physical systems such as a test lab, pilot line, or full scale production plant. In the case of the test lab, all logical controllers could be emulated in a single chassis and all logical software servers could run on one computer. In the pilot line, hardware controllers (e.g. microcontrollers) and multiple computers could be used, while in the production plant larger controllers (e.g. process automation controllers) and additional distributed computers might exist.

Figure 18:
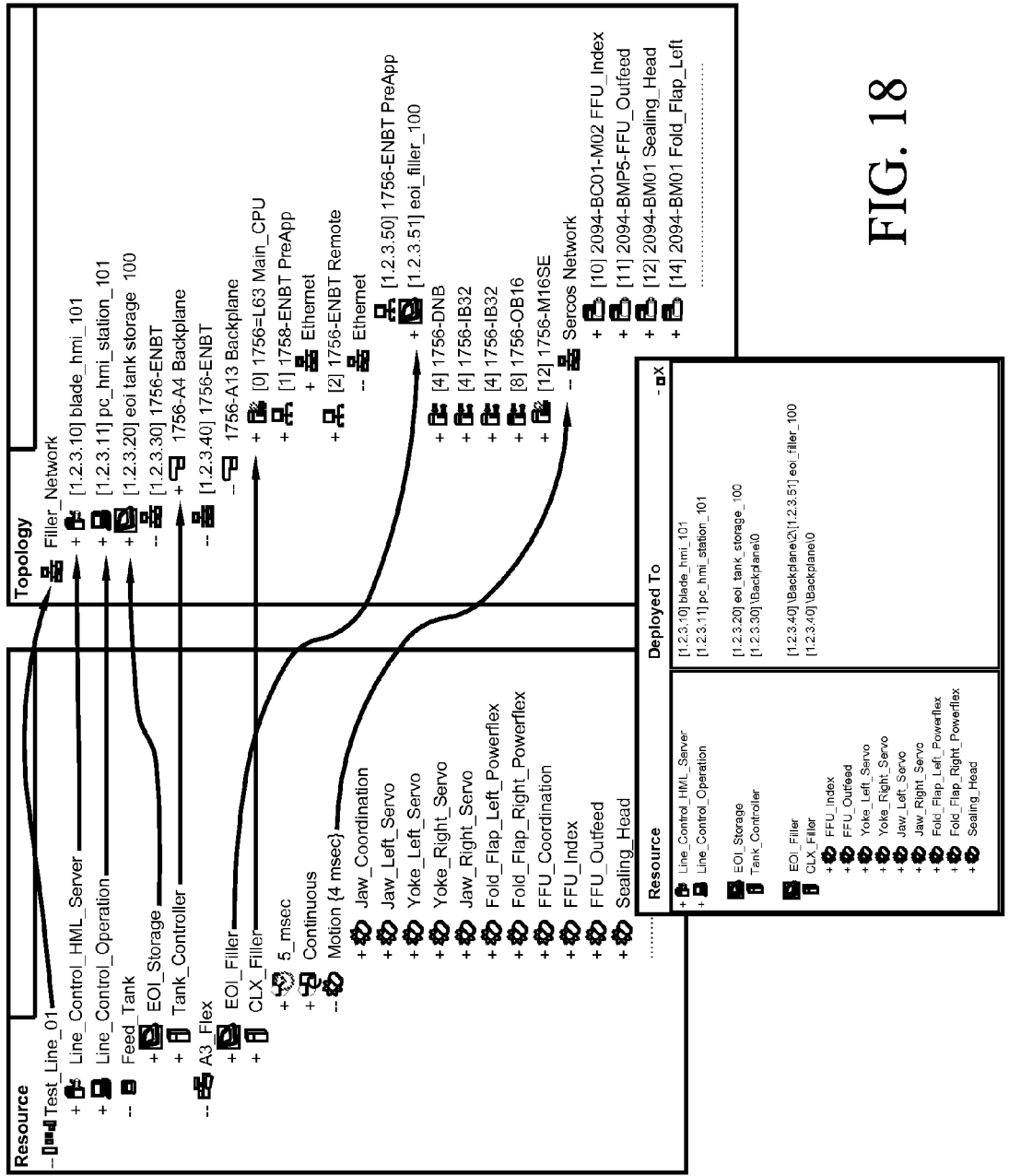
FIG. 18 illustrates a representative visualization of instances binding with controllers and hosts in accordance with an aspect of the subject specification.

In a Smart Belt Conveyor example, there can be logic, I/O connections, and HMI faceplates as some of the items to consider for binding. The user creates the bindings by assigning object instances (or groups of instances) to these logical resources. In order to perform this binding, the user can draw on a view of the computing resources in the control system. FIG. 18 discloses an example visualization 1800 for instances bound to controllers and human-machine interface (HMI) servers. Thus, there can be both automatic binding as well as manual binding Regarding the visualization 1800, there is overall binding of logical configuration named Test_Line_101 to the physical control and information system named Filler_Network. Further, there is binding of the CLX_Filler unit to a Logix controller named Main_CPU and of the EOI_Filler to an embedded HMI Server named eoi_filler_100. This action binds virtually all of the object instances contained in that unit to those computing resources. Within CLX_Filler, the user can choose to bind the individual object instances to the appropriate computing resources. For example, the user binds the drive components (e.g. motion axes) Jaw_Coordination, Jaw_Left_Servo, Yoke_Left_Servo, Yoke_Right_Servo, Jaw_Right_Servo, and the like to the appropriate resources in the Sercos Network, while Tank_Controller and EOI_Storage were bound to controller 1756-A4 and to eoi_tank_storage_100. The user can just as easily bound to same of different computing resources on an individual object basis. The binding does not require that just because all of these instances are in the same Line, that they be bound to the same computing resource. Selection of the computing resource to bind to is flexible, and is left to the discretion of the user. Nonetheless, the hierarchal composition of objects commonly does provide higher level operations to perform these binding actions on groups of items.

Part of the process for binding these object instances (particularly those that perform equipment control) is to connect physical I/O (input/output) to I/O modules available in the controller (to which they are bound) and to assign an execution schedule for the logic of the object. The controller in the control system view is roughly equivalent to an offline controller project file, and as such includes paths to the I/O modules and the tasks available in that controller. Similarly, the HMI Servers shown can be roughly equivalent to an HMI Project.

Figure 19:
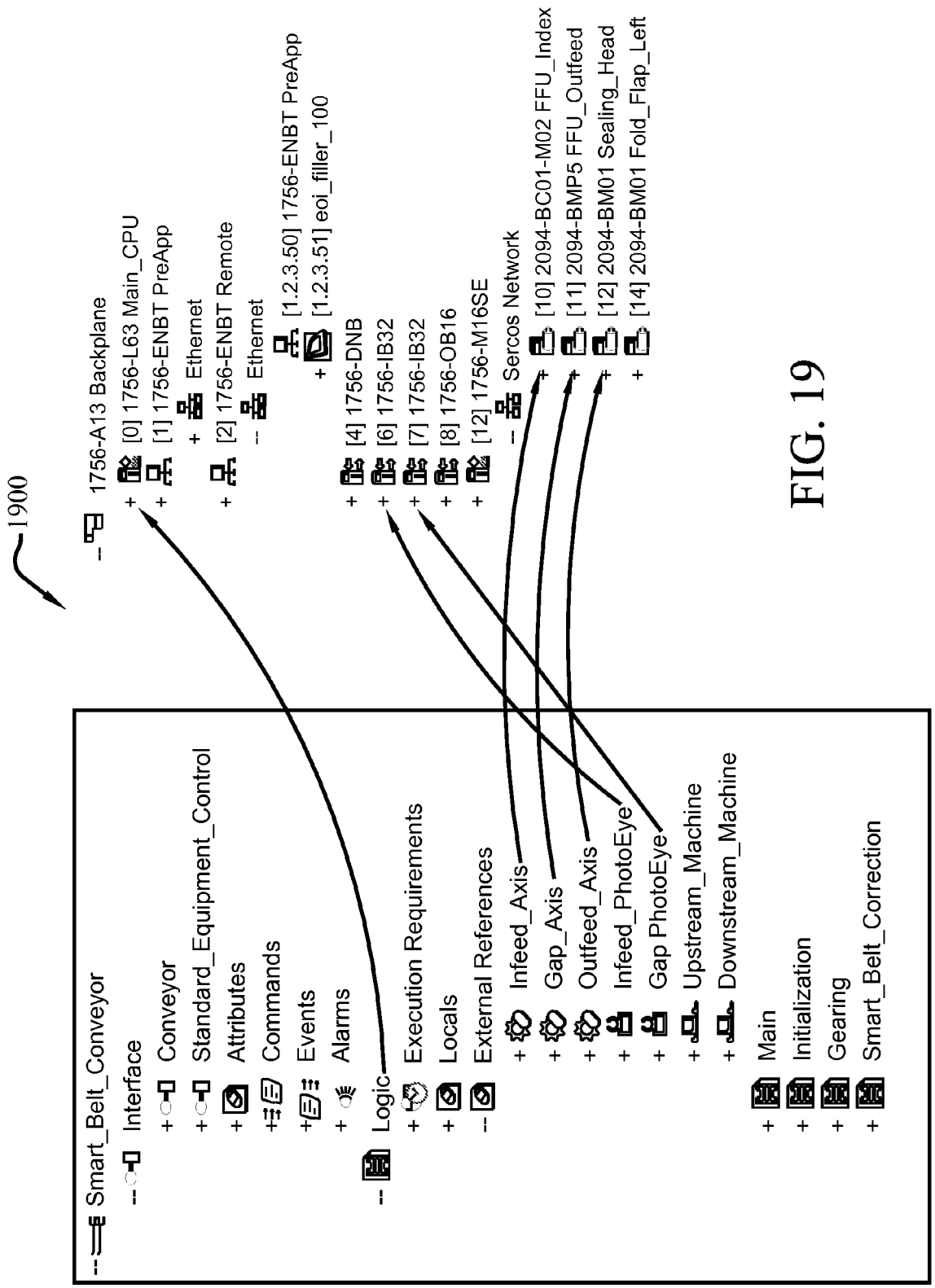
FIG. 19 illustrates a representative visualization for establishing a protocol for a process to bind components of a modular object in accordance with an aspect of the subject specification.

So, for the Smart Belt Conveyor example (FIG. 19), there can be two digital input points (e.g., Infeed and Outfeed Photoeyes) and three drives (e.g., Infeed, Gap, and Outfeed axes) that need to be bound. Additionally, the logic for the valve needs to be scheduled to execute at the required rate. If the controller to which the object instance is assigned contains I/O configuration and configured periodic and motion axes execution rates, then the system can recommend choices to accomplish these bindings. It is possible that some form of wizard can be used to facilitate the binding process in the user interface. FIG. 19 discloses an example visualization 1900 on how the I/O points and logic execution requirements can be established during this process.

Figure 20:
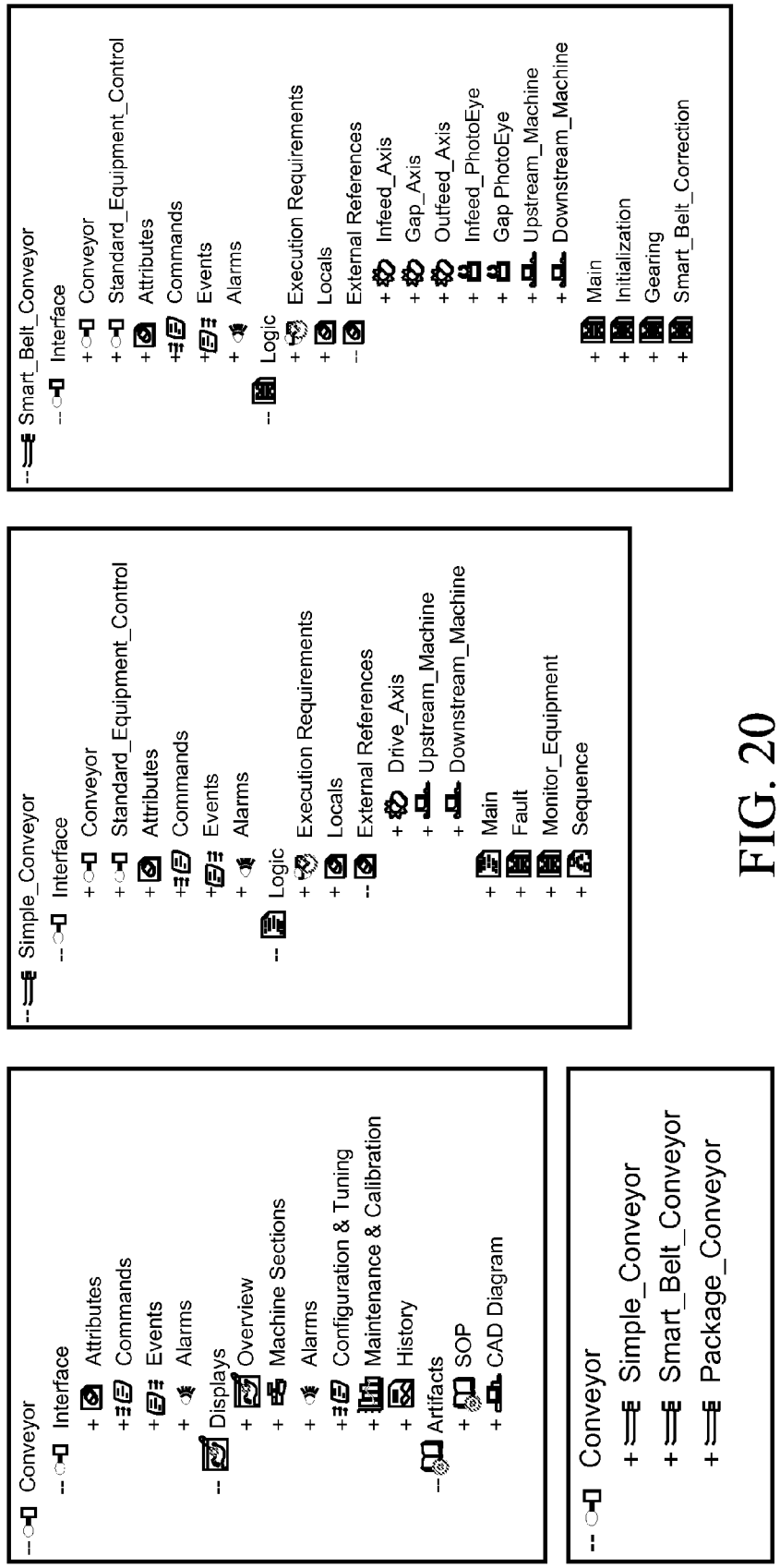
FIG. 20 illustrates representative visualizations relating to multiple modular object implementations supporting an interface in accordance with an aspect of the subject specification.

Once bound to its logical computing resources, a module instance could need to be deployed to one or more real, physical computing resources to prepare to control the devices in the plant. This can be accomplished by connecting the logical resources in the control system view to the physical resources in the network view. In FIG. 20, an example visualization set 2000 is disclosed that can be a Conveyor common Interface and an HMI faceplate.

There can also be development of logic. For example, a Smart Belt Conveyor can run on an automation controller, while other sections of it, such as the PhotoEye components might employ an RFID (Radio Frequency IDentification) smart device with an onboard processor, and the still other aspects might be supported by MES or ERP (Enterprise Resource Planning) applications (e.g. that might sequence a user through manual steps that facilitate performing a function). The logic can be developed in the language(s) that are appropriate to the execution platform. For example, a software application can use Java for a language.

Figure 21:
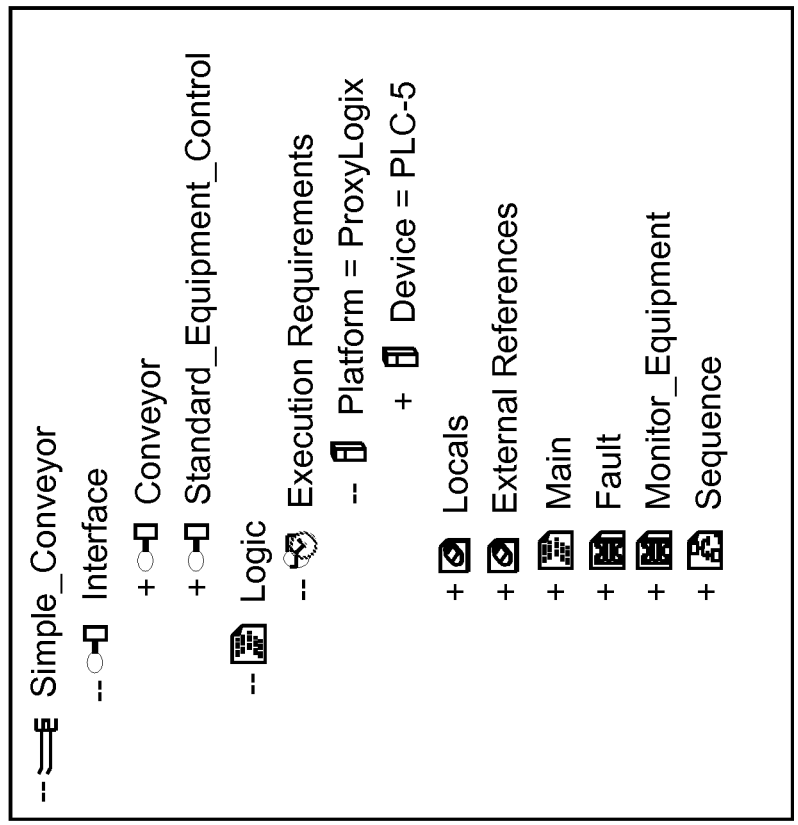
FIG. 21 illustrates a representative visualization relating to operational requirements of logic in accordance with an aspect of the subject specification.

Commonly, all of the applications and users of a Conveyor are not concerned with any of these underlying aspects of the logic; they use the common interface definition in the Conveyor and shared HMI faceplates. In many cases, the execution environment of the object (e.g., controller vs. MES execution environment) is less important than the function set provided by it (interface definition and semantics). FIG. 21 discloses an example visualization 2100 that can be Conveyor Logic for Multiple Platforms. In an illustrative example highlighted by the visualization 2100, logic for the Smart Belt Conveyor can be developed for an automation controller, and includes example requirements for version and execution rate. Meanwhile, logic for the Simple Conveyor can be developed for a legacy device using a proxy component. It is to be appreciated that modular objects can support predefined instances.

Figure 22:
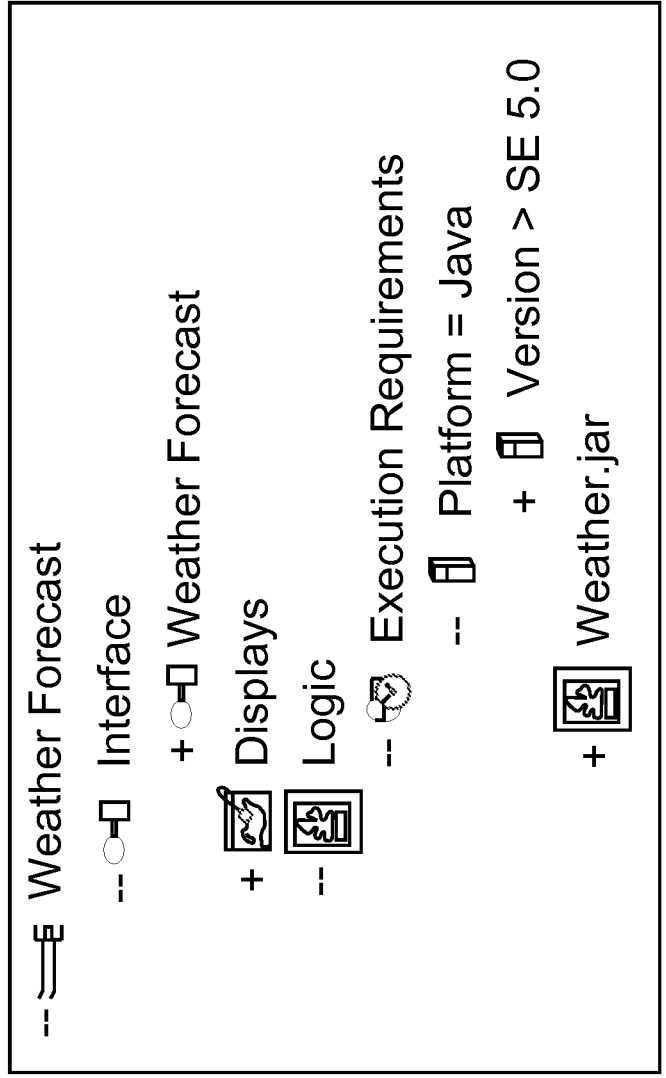
FIG. 22 illustrates a representative visualization disclosing information system logic in accordance with an aspect of the subject specification.

In a broad context of the modular automation, the logic for a modular object can be developed for many different platforms. As another example, consider a weather forecast object that is developed to interact with a web service provided by a weather channel's web site. If the system can support a software execution environment that allows users to develop object logic in Java and/or .NET, then the user can develop this object for that target platform. The use of predefined interfaces, definitions, objects, and instances is the same for the weather forecast object as it is for any other modular object. The logic development can vary based on the user's choice of the platform. FIG. 22 discloses an example visualization 2200 for Java Logic in a weather forecast object—however, it is to be appreciated that other modules can be used.

As part of developing an object's logic, users often require local work registers or variables to perform calculations and algorithmic functions. Much like the logic itself, the definition of this local data is commonly specific to the platform of the logic. In controllers, private tags are typically used for local data while in higher level object languages (e.g. Java) there might be variable declarations. Nonetheless, the user goal can be the same—to define some data that is private to the object logic and therefore cannot be accessed by anything except the logic.

For example, the logic for an object that controls a motion axis in a high speed packaging machine might need to execute every 5 milliseconds. On the other hand, it might be sufficient for a temperature control loop in a process application to run every ½ second. The logic for a higher level alarm management object might need to execute based on an alarm or event in the system.

Figure 23:
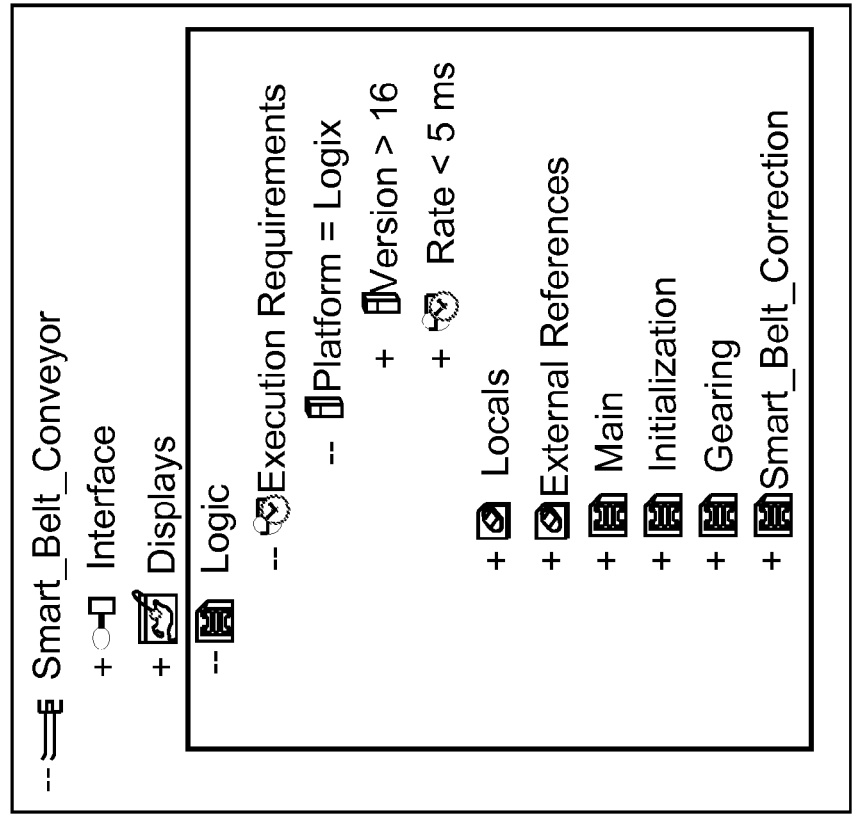
FIG. 23 illustrates a representative visualization of logic operational requirements for modular objects in accordance with an aspect of the subject specification.
Figure 23:
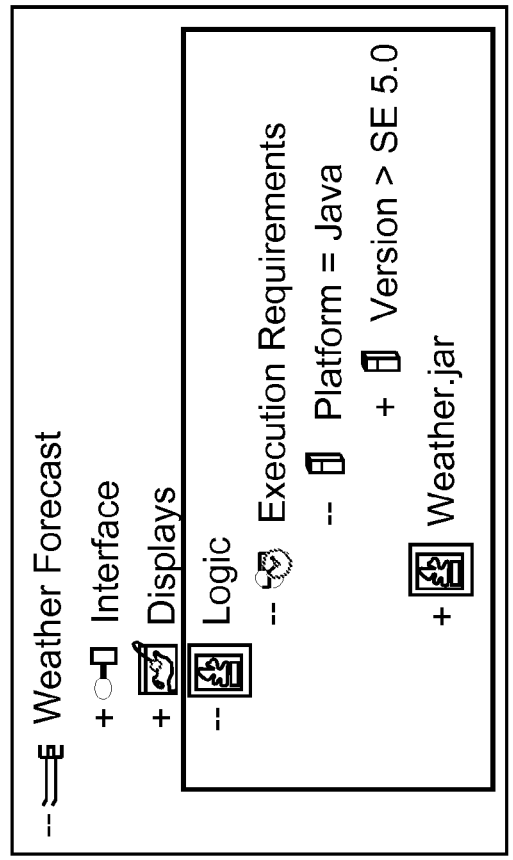

The configuration of the execution requirements for the object's logic also aids in the binding process when an object is assigned to a computing resource to execute. If the computing resource contains a definition of the execution environments it supports (e.g. in a controller the definition of Task with a configured rate), the system can suggest (or automatically assign) an appropriate binding for the object's logic. FIG. 23 can represent an example visualization 2300 of logic with local data and execution requirements.

Figure 24:
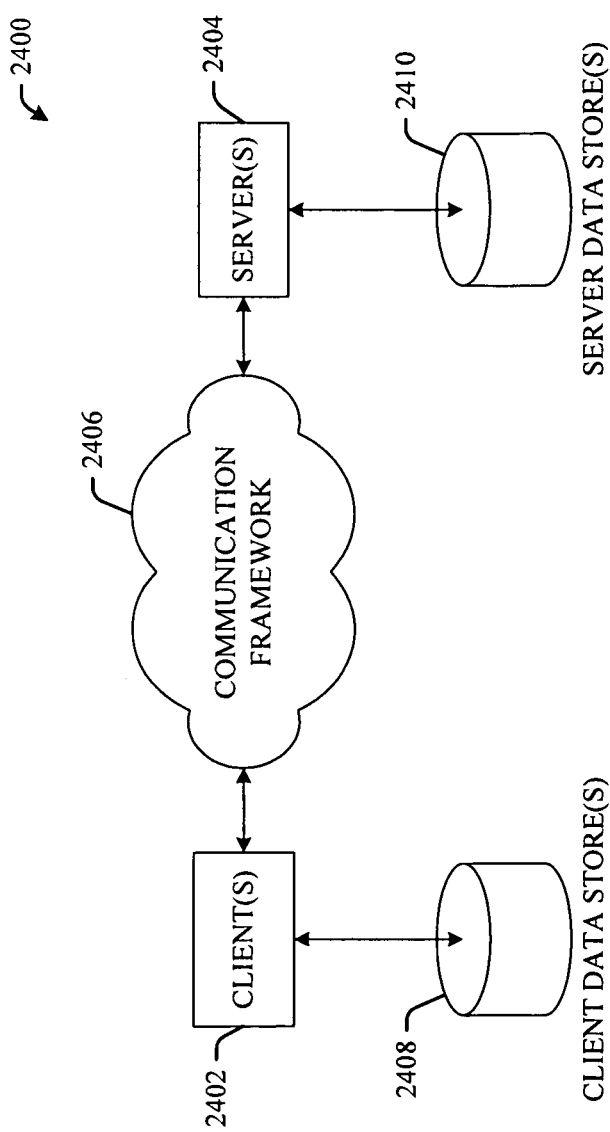
FIG. 24 illustrates an example of a schematic block diagram of a computing environment in accordance with an aspect subject specification.
Figure 25:
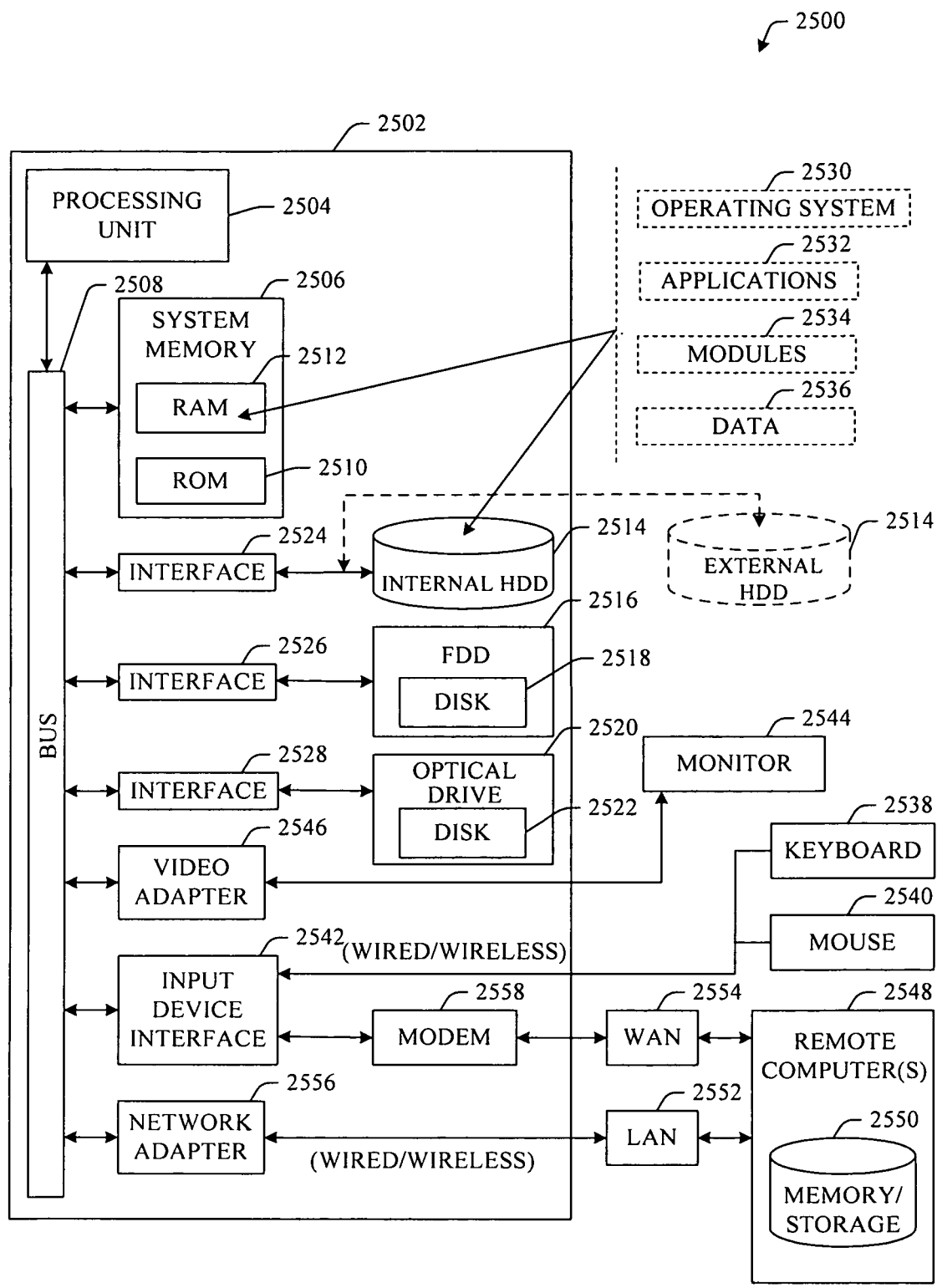
FIG. 25 illustrates an example of a block diagram of a computer operable to execute the disclosed architecture.

In order to provide a context for the various aspects of the disclosed subject matter, FIGS. 24 and 25 as well as the following discussion are intended to provide a brief, general description of a suitable environment in which the various aspects of the disclosed subject matter can be implemented. While the subject matter has been described above in the general context of computer-executable instructions of a program that runs on one or more computers, those skilled in the art will recognize that the subject matter described herein also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects can also be practiced in distributed computing environments where tasks are performed by remote processing devices that are linked through a communications network. However, some, if not all aspects of the claimed subject matter can be practiced on stand-alone computers. In a distributed computing environment, program modules can be located in both local and remote memory storage devices.

Referring now to FIG. 24, there is illustrated a schematic block diagram of a computing environment 2400 in accordance with the subject specification. The system 2400 includes one or more client(s) 2402. The client(s) 2402 can be hardware and/or software (e.g., threads, processes, computing devices). The client(s) 2402 can house cookie(s) and/or associated contextual information by employing the specification, for example.

The system 2400 also includes one or more server(s) 2404. The server(s) 2404 can also be hardware and/or software (e.g., threads, processes, computing devices). The servers 2404 can house threads to perform transformations by employing the specification, for example. One possible communication between a client 2402 and a server 2404 can be in the form of a data packet adapted to be transmitted between two or more computer processes. The data packet can include a cookie and/or associated contextual information, for example. The system 2400 includes a communication framework 2406 (e.g., a global communication network such as the Internet) that can be employed to facilitate communications between the client(s) 2402 and the server(s) 2404.

Communications can be facilitated via a wired (including optical fiber) and/or wireless technology. The client(s) 2402 are operatively connected to one or more client data store(s) 2408 that can be employed to store information local to the client(s) 2402 (e.g., cookie(s) and/or associated contextual information). Similarly, the server(s) 2404 are operatively connected to one or more server data store(s) 2410 that can be employed to store information local to the servers 2404.

Referring now to FIG. 25, there is illustrated a block diagram of a computer operable to execute the disclosed architecture. In order to provide additional context for various aspects of the subject specification, FIG. 25 and the following discussion are intended to provide a brief, general description of a suitable computing environment 2500 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embody computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of the any of the above should also be included within the scope of computer-readable media.

With reference again to FIG. 25, the example environment 2500 for implementing various aspects of the specification includes a computer 2502, the computer 2502 including a processing unit 2504, a system memory 2506 and a system bus 2508. The system bus 2508 couples system components including, but not limited to, the system memory 2506 to the processing unit 2504. The processing unit 2504 can be any of various commercially available processors or proprietary specific configured processors. Dual microprocessors and other multi-processor architectures can also be employed as the processing unit 2504.

The system bus 2508 can be any of several types of bus structure that can further interconnect to a memory bus (with or without a memory controller), a peripheral bus, and a local bus using any of a variety of commercially available bus architectures. The system memory 2506 includes read-only memory (ROM) 2510 and random access memory (RAM) 2512. A basic input/output system (BIOS) is stored in a non-volatile memory 2510 such as ROM, EPROM, EEPROM, which BIOS contains the basic routines that help to transfer information between elements within the computer 2502, such as during start-up. The RAM 2512 can also include a high-speed RAM such as static RAM for caching data.

The computer 2502 further includes an internal hard disk drive (HDD) 2514 (e.g., EIDE, SATA), which internal hard disk drive 2514 can also be configured for external use in a suitable chassis (not shown), a magnetic floppy disk drive (FDD) 2516, (e.g., to read from or write to a removable diskette 2518) and an optical disk drive 2520, (e.g., reading a CD-ROM disk 2522 or, to read from or write to other high capacity optical media such as the DVD). The hard disk drive 2514, magnetic disk drive 2516 and optical disk drive 2520 can be connected to the system bus 2508 by a hard disk drive interface 2524, a magnetic disk drive interface 2526 and an optical drive interface 2528, respectively. The interface 2524 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 2502, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, can also be used in the example operating environment, and further, that any such media can contain computer-executable instructions for performing the methods of the specification.

A number of program modules can be stored in the drives and RAM 2512, including an operating system 2530, one or more application programs 2532, other program modules 2534 and program data 2536. All or portions of the operating system, applications, modules, and/or data can also be cached in the RAM 2512. It is appreciated that the specification can be implemented with various proprietary or commercially available operating systems or combinations of operating systems.

A user can enter commands and information into the computer 2502 through one or more wired/wireless input devices, e.g., a keyboard 2538 and a pointing device, such as a mouse 2540. Other input devices (not shown) can include a microphone, an IR remote control, a joystick, a game pad, a stylus pen, touch screen, or the like. These and other input devices are often connected to the processing unit 2504 through an input device interface 2542 that is coupled to the system bus 2508, but can be connected by other interfaces, such as a parallel port, an IEEE 1394 serial port, a game port, a USB port, an IR interface, etc.

A monitor 2544 or other type of display device is also connected to the system bus 2508 via an interface, such as a video adapter 2546. In addition to the monitor 2544, a computer typically includes other peripheral output devices (not shown), such as speakers, printers, etc.

The computer 2502 can operate in a networked environment using logical connections via wired and/or wireless communications to one or more remote computers, such as a remote computer(s) 2548. The remote computer(s) 2548 can be a workstation, a server computer, a router, a personal computer, portable computer, microprocessor-based entertainment appliance, a peer device or other common network node, and typically includes many or all of the elements described relative to the computer 2502, although, for purposes of brevity, only a memory/storage device 2550 is illustrated. The logical connections depicted include wired/wireless connectivity to a local area network (LAN) 2552 and/or larger networks, e.g., a wide area network (WAN) 2554. Such LAN and WAN networking environments are commonplace in offices and companies, and facilitate enterprise-wide computer networks, such as intranets, all of which can connect to a global communications network, e.g., the Internet.

When used in a LAN networking environment, the computer 2502 is connected to the local network 2552 through a wired and/or wireless communication network interface or adapter 2556. The adapter 2556 can facilitate wired or wireless communication to the LAN 2552, which can also include a wireless access point disposed thereon for communicating with the wireless adapter 2556.

When used in a WAN networking environment, the computer 2502 can include a modem 2558, or is connected to a communications server on the WAN 2554, or has other means for establishing communications over the WAN 2554, such as by way of the Internet. The modem 2558, which can be internal or external and a wired or wireless device, is connected to the system bus 2508 via the input device interface 2542. In a networked environment, program modules depicted relative to the computer 2502, or portions thereof, can be stored in the remote memory/storage device 2550. It will be appreciated that the network connections shown are example and other means of establishing a communications link between the computers can be used.

The computer 2502 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

The aforementioned systems have been described with respect to interaction among several components. It should be appreciated that such systems and components can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

As used herein, the terms to "infer" or "inference" refer generally to the process of reasoning about or deducing states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the claimed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications can be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to disclose concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methodologies for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor;
   a memory storing computer executable components and communicatively coupled to the processor to facilitate operation of the computer executable components comprising:
      an evaluation component configured to identify a first operational requirement of a first industrial modular object; and
      a group component configured to:
         determine whether at least one host of a set of hosts has a capability to satisfy the first operation requirement;
         in response to a determination that there is not at least one host of the set of hosts that has the capability to satisfy the first operational requirement:
            at least one of monitor the set of hosts for a modification of a host of the set of hosts to include the capability to satisfy the first operational requirement, monitor the set of hosts for addition of another host to the set of hosts that has the capability to satisfy the first operational requirement, or modify the host of the set of hosts to include the capability to satisfy the first operational requirement; and
            determine whether to bind the first industrial modular object with the host or other host; and
         in response to a determination that there is at least one host of the set of hosts that has the capability to satisfy the first operational requirement, determine whether to bind the first industrial modular object with the at least one host according to:
            in response to a determination that there is only one host of the set of hosts that has the capability to satisfy the first operational requirement:
               determine whether the one host is available to be bound to the first industrial modular object:
                  in response to a determination that the one host is available to be bound with the first industrial modular object, bind the first industrial modular object with the one host; and
                  in response to a determination that the one host is not available to be bound with the first industrial modular object:
                     identify a second industrial modular object having a second operational requirement and that is currently bound with the one host that also satisfies the second operational requirement;
                     identify another host of the set of hosts that has another capability to satisfy the second operational requirement;
                     unbind the second industrial modular object from the one host;
                     bind the second industrial modular object with the other host; and
                     bind the first industrial modular object with the one host.

2. The system of claim 1, wherein to determine whether to bind the first industrial modular object with the at least one host further comprises:
   in response to a determination that there is a plurality of hosts of the set of hosts that have the capability to satisfy the first operational requirement:
      prompt for input to select which of the plurality of hosts to bind to the industrial modular object; and
      based on received input indicating selection of one or more hosts, bind the one or more hosts with the industrial modular object.

3. The system of claim 2, wherein the prompt indicates at least one of estimated performance of respective hosts, estimated performance of the industrial modular object, actual performance of respective hosts, or actual performance of the industrial modular object.

4. The system of claim 1, wherein the first operational requirement is greater than the second operational requirement and the capability is greater than the other capability.

5. A method, comprising:
   identifying, by a system including a processor, a first operational requirement of a first industrial modular object;
   determining, by the system, whether at least one host of a set of hosts has a capability to satisfy the first operational requirement;
   in response to determining that there is not at least one host of the set of hosts that has the capability to satisfy the first operational requirement:
      at least one of monitoring, by the system, the set of hosts for a modification of a host of the set of hosts to include the capability to satisfy the first operational requirement, monitoring, by the system, the set of hosts for addition of another host to the set of hosts that has the capability to satisfy the first operational requirement, or modifying, by the system, the host of the set of hosts to include the capability to satisfy the first operational requirement; and determining, by the system, whether to bind the first industrial modular object with the host or other host; and in response to determining that there is at least one host of the set of hosts that has the capability to satisfy the first operational requirement, determining, by the system, whether to bind the first industrial modular object with the at least one host according to:

in response to determining that there is only one host of the set of hosts that has the capability to satisfy the first operational requirement:

determining whether the one host is available to be bound to the first industrial modular object:

in response to determining that the one host is available to be bound with the first industrial modular object, binding the first industrial modular object with the one host; and in response to determining that the one host is not available to be bound with the first industrial modular object:

identifying a second industrial modular object having a second operational requirement and that is currently bound with the one host that also satisfies the second operational requirement;

identifying another host of the set of hosts that has another capability to satisfy the second operational requirement;

unbinding the second industrial modular object from the one host;

binding the second industrial modular object with the other host; and binding the first industrial modular object with the one host.

6. The method of claim 5, wherein the first operational requirement is greater than the second operational requirement and the capability is greater than the other capability.

7. The method of claim 5, wherein the determining whether to bind the first industrial modular object with the at least one host further comprises:

in response to a determination that there is a plurality of hosts of the set of hosts that have the capability to satisfy the first operational requirement:

prompting for input to select which of the plurality of hosts to bind to the industrial modular object; and based on received input indicating selection of one or more hosts, binding the one or more hosts with the industrial modular object.

8. The method of claim 7, wherein the prompt indicates at least one of estimated performance of respective hosts, estimated performance of the industrial modular object, actual performance of respective hosts, or actual performance of the industrial modular object.

9. The method of claim 5, wherein the first operational requirement of the industrial modular object represents at least one classification including at least one of required, critical, preferred, or optional.

10. A system, comprising:

means for identifying a first operational requirement of a first industrial modular object;

means for determining whether at least one host of a set of hosts has a capability to satisfy the first operational requirement;

means for, in response to determining that there is not at least one host of the set of hosts that has the capability to satisfy the first operational requirement:

at least one of monitoring the set of hosts for a modification of a host of the set of hosts to include the capability to satisfy the first operational requirement, monitoring the set of hosts for addition of another host to the set of hosts that has the capability to satisfy the first operational requirement, or modifying, by the system, the host of the set of hosts to include the capability to satisfy the first operational requirement; and determining whether to bind the first industrial modular object with the host or other host; and means for, in response to determining that there is at least one host of the set of hosts that has the capability to satisfy the first operational requirement, determining whether to bind the first industrial modular object with the at least one host according to:

in response to determining that there is only one host of the set of hosts that has the capability to satisfy the first operational requirement:

determining whether the one host is available to be bound to the first industrial modular object:

in response to determining that the one host is available to be bound with the first industrial modular object, binding the first industrial modular object with the one host; and in response to determining that the one host is not available to be bound with the first industrial modular object:

identifying a second industrial modular object having a second operational requirement and that is currently bound with the one host that also satisfies the second operational requirement;

identifying another host of the set of hosts that has another capability to satisfy the second operational requirement;

unbinding the second industrial modular object from the one host;

binding the second industrial modular object with the other host; and binding the first industrial modular object with the one host.

11. The system of claim 10, wherein the first operational requirement is greater than the second operational requirement and the capability is greater than the other.

12. The system of claim 10, wherein the means for determining whether to bind the first industrial modular object with the at least one host further comprises:

means for, in response to a determination that there is a plurality of hosts of the set of hosts that have the capability to satisfy the first operational requirement:

prompting for input to select which of the plurality of hosts to bind to the industrial modular object; and based on received input indicating selection of one or more hosts, binding the one or more hosts with the industrial modular object.

13. A non-transitory computer readable medium having stored thereon computer-executable instructions that, in response to execution, cause an apparatus to perform operations, comprising:

identifying a first operational requirement of a first industrial modular object; and determining whether at least one host of a set of hosts has a capability to satisfy the first operational requirement;

in response to determining that there is not at least one host of the set of hosts that has the capability to satisfy the first operational requirement:

at least one of monitoring the set of hosts for a modification of a host of the set of hosts to include the capability to satisfy the first operational requirement, monitoring the set of hosts for addition of another host to the set of hosts that has the capability to satisfy the first operational requirement, or modifying, by the system, the host of the set of hosts to include the capability to satisfy the first operational requirement; and determining whether to bind the first industrial modular object with the host or other host; and in response to determining that there is at least one host of the set of hosts that has the capability to satisfy the first operational requirement, determining whether to bind the first industrial modular object with the at least one host according to:

in response to determining that there is only one host of the set of hosts that has the capability to satisfy the first operational requirement:

determining whether the one host is available to be bound to the first industrial modular object:

in response to determining that the one host is available to be bound with the first industrial modular object, binding the first industrial modular object with the one host; and in response to determining that the one host is not available to be bound with the first industrial modular object:

identifying a second industrial modular object having a second operational requirement and that is currently bound with the one host that also satisfies the second operational requirement;

identifying another host of the set of hosts that has another capability to satisfy the second operational requirement;

unbinding the second industrial modular object from the one host;

binding the second industrial modular object with the other host; and binding the first industrial modular object with the one host.

14. The non-transitory computer readable medium of claim 13, wherein the first operational requirement is greater than the second operational requirement and the capability is greater than the other capability.

15. The non-transitory computer readable medium of claim 13, wherein the determining whether to bind the first industrial modular object with the at least one host further comprises:

in response to a determination that there is a plurality of hosts of the set of hosts that have the capability to satisfy the first operational requirement:

prompting for input to select which of the plurality of hosts to bind to the industrial modular object; and based on received input indicating selection of one or more hosts, binding the one or more hosts with the industrial modular object.

16. The non-transitory computer readable medium of claim 15, wherein the prompt indicates at least one of estimated performance of respective hosts, estimated performance of the industrial modular object, actual performance of respective hosts, or actual performance of the industrial modular object.

* * * * *